United States Patent
Kim

(10) Patent No.: US 10,747,854 B2
(45) Date of Patent: Aug. 18, 2020

(54) METHOD FOR CONCEALING DATA AND DATA OBFUSCATION DEVICE USING THE SAME

(71) Applicant: Deeping Source Inc., Seoul (KR)

(72) Inventor: Tae Hoon Kim, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

(21) Appl. No.: 16/513,715

(22) Filed: Jul. 17, 2019

(65) Prior Publication Data

US 2020/0034565 A1    Jan. 30, 2020

(30) Foreign Application Priority Data

Jul. 26, 2018    (KR) .................... 10-2018-0086929

(51) Int. Cl.
*G06F 21/62* (2013.01)
*G06F 21/14* (2013.01)
(Continued)

(52) U.S. Cl.
CPC .......... *G06F 21/14* (2013.01); *G06F 21/6245* (2013.01); *G06F 21/6254* (2013.01);
(Continued)

(58) Field of Classification Search
CPC .. G06F 21/6254; G06F 17/2765; G06F 21/14; G06F 40/279; G06F 21/6245;
(Continued)

(56) References Cited

U.S. PATENT DOCUMENTS

2006/0269098 A1    11/2006    Ebitani
2011/0246787 A1*   10/2011    Farrugia ............... G06F 21/60
                                                        713/189
(Continued)

FOREIGN PATENT DOCUMENTS

| JP | 2018-106216 A | 7/2018 |
| KR | 10-2017-0092631 A | 8/2017 |
| KR | 10-1861520 B1 | 5/2018 |

OTHER PUBLICATIONS

Rusell, Stuart, and Peter Norvig. "Artificial intelligence: A modern approach." Pretice Hall Series in Artificial Intelligence 1, pp. 649-789. (Year: 2003).*

*Primary Examiner* — Farid Homayounmehr
*Assistant Examiner* — Sanchit K Sarker
(74) *Attorney, Agent, or Firm* — Xsensus LLP

(57) ABSTRACT

A method for concealing original data to protect personal information is provided. The method includes steps of: a data obfuscation device (a) if the original data is acquired, inputting the original data or its modified data into a learning network, and allowing the learning network to (i) apply a network operation to the original data or the modified data using learned parameters of the learning network and thus to (ii) output characteristic information on the original data or the modified data; and (b) updating the original data or the modified data via backpropagation using part of (i) 1-st losses calculated by referring to the characteristic information and its corresponding 1-st ground truth, and (ii) 2-nd losses calculated by referring to (ii-1) a task specific output generated by using the characteristic information (ii-2) a 2-nd ground truth corresponding to the task specific output, to thereby generate obfuscated data.

16 Claims, 9 Drawing Sheets
(2 of 9 Drawing Sheet(s) Filed in Color)

(51) Int. Cl.
*G06K 9/62* (2006.01)
*G06N 3/04* (2006.01)
*G06N 3/08* (2006.01)
*G06F 40/279* (2020.01)

(52) U.S. Cl.
CPC ......... *G06F 40/279* (2020.01); *G06K 9/6256* (2013.01); *G06K 9/6257* (2013.01); *G06N 3/04* (2013.01); *G06N 3/0454* (2013.01); *G06N 3/084* (2013.01)

(58) Field of Classification Search
CPC ........ G06N 3/084; G06N 3/0454; G06N 3/04; G06K 9/6257; G06K 9/6256
USPC ........................................................ 713/189
See application file for complete search history.

(56) References Cited

U.S. PATENT DOCUMENTS

2019/0034483 A1\* 1/2019 Millius ................. G06F 16/335
2019/0188830 A1\* 6/2019 Edwards ................ G06N 3/088

\* cited by examiner

ORIGINAL DATA
(64 SAMPLES
FROM CIFAR10 DATASET)

OBFUSCATED DATA

METHOD FOR CONCEALING DATA AND DATA OBFUSCATION DEVICE USING THE SAME

CROSS-REFERENCE TO RELATED APPLICATION

The present application claims priority to KR 10-2018-0086929 filed Jul. 26, 2018, the entire contents of which are incorporated herein by reference.

FIELD OF THE DISCLOSURE

The present disclosure relates to a method for concealing data and a data obfuscation device using the same; and more particularly, to the method for concealing identification information included in the data to be inputted into a learning network and the data obfuscation device using the same.

BACKGROUND OF THE DISCLOSURE

Big data refers to data including all of unstructured data and semi-structured data not utilized so far, like e-commerce data, metadata, web log data, radio frequency identification (RFD) data, sensor network data, social network data, data of Internet text and documents, Internet search indexing data, as well as all of structured data used by conventional enterprises or public institutions. Data as such is referred to as big data in the sense that common software tools and computer systems cannot handle such a huge volume of data.

And, although such big data may be insignificant by itself, it can be useful for generation of new data, judgment, or prediction in various fields through machine learning on patterns and the like.

Recently, due to the strengthening of a personal information protection act, it is required to delete information that can be used for identifying individuals from the data or to acquire consent of the individuals in order to trade or share such big data. However, it is not easy to check if a large amount of big data includes information that can be used for identifying the individuals, and it is impossible to obtain the consent of the individuals. Therefore, various techniques for such purposes are emerging.

As an example of a related prior art, a technique is disclosed in Korean Patent Registration No. 1861520. According to this technique, a face-concealing method is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, in the input image, where the second image is generated to have a facial shape different from that of the facial region detected in the detection step.

However, according to conventional techniques as well as the technique described above, whether identification information such as faces, text, etc. is included in the data is determined, and at least one portion corresponding to the identification information is masked or blurred, thus machine learning cannot utilize such information due to damage to original data, and in some cases, the data even contains unexpected identification information and the unexpected identification information cannot be concealed, e.g., anonymized. In particular, a conventional security camera performs an anonymizing process by blurring all pixels having a change between frames in a video image, and when the anonymizing process is performed in this manner, critical information such as facial expression of an anonymized face becomes different from information contained in an original video image, and the personal identification information missing during face detection may remain on the original video image. Also, the blurred video image may be reverted to the original image using one of conventional video deblurring techniques.

Accordingly, the inventors of the present disclosure propose a method for generating obfuscated data such that the obfuscated data is different from the original data while an output result of inputting the original data into a machine learning model and an output result of inputting the obfuscated data into the learning model are same or similar to each other.

SUMMARY OF THE DISCLOSURE

It is an object of the present disclosure to solve all the aforementioned problems.

It is another object of the present disclosure to perform anonymization in a simple and accurate way, since processes of finding personal identification information in data are eliminated.

It is still another object of the present disclosure to protect privacy and security of original data by generating irreversibly obfuscated and anonymized data from the original data.

It is still yet another object of the present disclosure to generate data recognized as similar or same by a computer, but recognized as different by a human.

It is still yet another object of the present disclosure to stimulate a big data trade market.

In accordance with one aspect of the present disclosure, there is provided a method for concealing original data to protect personal information, including steps of (a) a data obfuscation device, if the original data is acquired, inputting the original data or its modified data into a learning network, and allowing the learning network to (i) apply a network operation to the original data or the modified data using one or more learned parameters of the learning network and thus to (ii) output characteristic information on the original data or the modified data; and (b) the data obfuscation device updating the original data or the modified data via back-propagation using at least part of (i) one or more 1-st losses calculated by referring to the characteristic information and its corresponding at least one 1-st ground truth, and one or more 2-nd losses calculated by referring to (ii-1) at least one task specific output generated by using the characteristic information and (ii-2) at least one 2-nd ground truth corresponding to the task specific output, to thereby generate obfuscated data corresponding to the original data.

As one example, the learning network includes a 1-st learning network to an n-th learning network respectively having one or more 1-st learned parameters to one or more n-th learned parameters wherein n is an integer greater than 0, wherein, at the step of (a), the data obfuscation device inputs the original data or the modified data into the 1-st learning network, and allows the 1-st learning network to (i) apply a network operation to the original data or the modified data using the 1-st learned parameters of the 1-st learning network and thus to (ii) output 1-st characteristic information on the original data or the modified data, wherein, at the step of (b), the data obfuscation device updates the original data or the modified data via backpropagation using at least part of (i) one or more (1_1)-st losses calculated by referring to the 1-st characteristic information and its corresponding at least one (1_1)-st ground truth, and one or more (2_1)-st losses calculated by referring to (ii-1) at least one 1-st task specific output generated by using the 1-st characteristic information and (ii-2) at least one (2_1)-st ground truth corresponding to the 1-st task specific output, to thereby generate 1-st obfuscated data corresponding to the original data or the modified data, and wherein, while increasing an integer k from 2 to n, the data obfuscation device repeats processes of (i) inputting (k−1)-th obfuscated data into a k-th learning network, and allowing the k-th learning network to (i-1) apply a network operation to the (k−1)-th obfuscated data using one or more k-th learned parameters of the k-th learning network and thus to (i-2) output k-th characteristic information on the (k−1)-th obfuscated data, and (ii) updating the (k−1)-th obfuscated data via backpropagation using at least part of (ii-1) one or more (1_k)-th losses calculated by referring to the k-th characteristic information and its corresponding at least one (1_k)-th ground truth and (ii-2) one or more (2_k)-th losses calculated by referring to at least one k-th task specific value and at least one (2_k)-th ground truth wherein the k-th task specific value is generated by using the k-th characteristic information and the (2_k)-th ground truth corresponds to the k-th task specific value, to thereby generate k-th obfuscated data corresponding to the (k−1)-th obfuscated data, and wherein, as a result of the repeated processes, n-th obfuscated data which are the obfuscated data corresponding to the original data are generated.

As one example, the data obfuscation device updates the original data or the modified data via backpropagation using at least part of (i) a 1-st average loss which is an average over the (1_1)-st losses to (1_n)-th losses, (ii) a 2-nd average loss which is an average over the (2_1)-st losses to (2_n)-th losses and (iii) a 3-rd average loss which is an average over a 1-st sum loss to an n-th sum loss wherein each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data.

As one example, at the step of (b), the data obfuscation device maintains the learned parameters of the learning network at constant values during the backpropagation using at east part of the 1-st losses and the 2-nd losses.

As one example, at the step of (b), the data obfuscation device acquires at least one loss gradient for minimizing at least part of the 1-st losses and the 2-nd losses, and backpropagates the loss gradient to the original data or the modified data.

As one example, at the step of (a), the data obfuscation device generates the modified data corresponding to the original data by performing at least one of a process of adding a random noise created by a random noise generating network to the original data, a process of blurring the original data and, a process of changing a resolution of the original data.

As one example, the learning network includes a 1-st learning network to an n-th learning network respectively having one or more 1-st learned parameters to one or more n-th learned parameters wherein n is an integer greater than 0, wherein, at the step of (a), the data obfuscation device inputs the original data or the modified data into each of the 1-st learning network to the n-th learning network, and allows each of the 1-st learning network to the n-th learning network to (i) apply its corresponding network operation to the original data or the modified data using respectively the 1-st learned parameters to the n-th learned parameters of the 1-st learning network to the n-th learning network, and thus to (ii) output each piece of 1-st characteristic information to n-th characteristic information on the original data or the modified data, and wherein, at the step of (b), the data obfuscation device updates the original data or the modified data via backpropagation using at least part of (i) one of the 1-st losses which is an average over (1_1)-st losses to (1_n)-th losses wherein the (1_1)-st losses to the (1_n)-th losses are calculated by referring to the 1-st characteristic information to the n-th characteristic information and at least one (1_1)-st ground truth to at least one (1_n)-th ground truth respectively corresponding to the 1-st characteristic information to the n-th characteristic information, (ii) one of the 2-nd losses which is an average over (2_1)-st losses to (2_n)-th losses wherein the (2_1)-st losses to the (2_n)-th losses are calculated by referring to a 1-st task specific output to an n-th task specific output generated by using each piece of the 1-st characteristic information to the n-th characteristic information and by further referring to at least one (2_1)-st ground truth to at leas (2_n)-th ground truth respectively corresponding to 1-st task specific output to the n-th task specific output, and (iii) a 3-rd loss which is an average over a 1-st sum loss to an n-th sum loss wherein each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data corresponding to the original data.

In accordance with another aspect of the present disclosure, there is provided a method for concealing original data to protect personal information, including steps of: (a) a data obfuscation device, if the original data is acquired, modifying the original data, to thereby generate modified data; (b) the data obfuscation device, (i) inputting the original data into a learning network; and allowing the learning network to (i-1) apply a network operation to the original data using one or more learned parameters of the learning network and thus to (i-2) output 1-st characteristic information on the original data, and (ii) inputting the modified data into the learning network, and allowing the learning network to (ii-1) apply a network operation to the modified data using the learned parameters and thus to (ii-2) output 2-nd characteristic information on the modified data; and (c) the data obfuscation device updating the original data or the modified data via backpropagation using one or more data losses created by referring to at least part of (i) one or more 1-st losses calculated by referring to the 1-st characteristic information and the 2-nd characteristic information, and (ii) one or more 2-nd losses calculated by referring to (ii-1) at least one task specific output generated by using the 2-nd characteristic information and (ii-2) at least one ground truth corresponding to the task specific output, to thereby generate obfuscated data corresponding to the original data.

As one example, the learning network includes a 1-st learning network to an n-th learning network respectively having one or more 1-st learned parameters to one or more n-th learned parameters wherein n is an integer greater than 0, wherein, at the step of (b), the data obfuscation device performs processes of (i) inputting the original data into the 1-st learning network, and allowing the 1-st learning network to (i-1) apply a network operation to the original data using one or more 1-st learned parameters of the 1-st learning network and thus to (i-2) output (1_1)-st characteristic information on the original data, and (ii) inputting the modified data into the 1-st learning network, and allowing the 1-st learning network to (ii-1) apply a network operation to the modified data using the 1-st learned parameters and thus to (ii-2) output (2_1)-st characteristic information on the modified data, wherein, at the step of (c), the data obfuscation device updates the modified data via backpropagation using one or more 1-st data losses calculated by referring to at least part of (i) one or more (1_1)-st losses created by referring to the (1_1)-st characteristic information and the (2_1)-st characteristic information, and (ii) one or more (2_1)-st losses created by referring to (ii-1) at least one 1-st task specific output generated by using the (2_1)-st characteristic information and (ii-2) at least one 1-st ground truth corresponding to the 1-st task specific output, to thereby generate 1-st obfuscated data corresponding to the modified data, and wherein, while increasing an integer k from 2 to n, the data obfuscation device repeats processes of (i) inputting the original data into a k-th learning network, and allowing the k-th learning network to (i-1) apply a network operation to the original data using one or more k-th learned parameters of the k-th learning network and thus to (i-2) output (1_k)-th characteristic information on the original data, inputting (k_1)-th obfuscated data into the k-th learning network, and allowing the k-th learning network to (ii-1) apply a network operation to the (k−1)-th obfuscated data using the k-th learned parameters and thus to (ii-2) output (2_k)-th characteristic information on the (k−1)-th obfuscated data, and (iii) updating the (k−1)-th obfuscated data by backpropagation using one or more k-th data losses created by referring to at least part of (iii-1) one or more (1_k)-th losses calculated by referring to the (1_k)-th characteristic information and the (2_k)-th characteristic information and (iii-2) one or more (2_k)-th losses calculated by referring to at least one k-th task specific output generated by using the (2_k)-th characteristic information and at least one k-th ground truth corresponding to the k-th task specific output, to generate k-th obfuscated data corresponding to the (k−1)-th obfuscated data, and wherein, as a result of the repeated processes, n-th obfuscated data which are the obfuscated data corresponding to the original data are generated.

As one example, the data obfuscation device updates the original data or the modified data via backpropagation using at least one average data loss which is an average over the 1-st data losses to the n-th data losses, to thereby generate the obfuscated data.

As one example, the data obfuscation device (i) calculates, as the 1-st sub losses, at least one average loss which is an average over the (1_1)-st losses to the (1_n)-th losses, and (ii) calculates the 2-nd sub losses by referring to the specific characteristic information and an average over the (2_1)-st characteristic information to the (2_n)-th characteristic information.

As one example, at the step of (c), the data obfuscation device maintains the learned parameters of the learning network at constant values during the backpropagation using the data losses.

As one example, at the step of (a), the data obfuscation device generates the modified data corresponding to the original data by performing at least one of a process of adding a random noise created by a random noise generating network to the original data, a process of blurring of the original data, and a process of changing a resolution of the original data.

As one example, the learning network includes a 1-st learning network to an n-th learning network respectively having one or more 1-st learned parameters to one or more n-th learned parameters wherein n is an integer greater than 0, wherein, at the step of (b), the data obfuscation device (i) inputs the original data and the modified data into each of the 1-st learning network to the n-th learning network, and (ii) allows each of the 1-st learning network to the n-th learning network to (ii-1) apply its corresponding network operation to the original data and the modified data using respectively the 1-st learned parameters to the n-th learned parameters of the 1-st learning network to the n-th learning network, thus to (ii-2) output each piece of (1_1)-st characteristic information to (1_n)-th characteristic information on the original data using respectively the 1-st learned parameters to the n-th learned parameters, and (ii-3) output each piece of (2_1)-st characteristic information to (2_n)-th characteristic information on the modified data, wherein, at the step of (c), the data obfuscation device updates the original data or the modified data via backpropagation using at least part of (i) one of the 1-st losses which is an average over (1_1)-st losses to (1_n)-th losses wherein the (1_1)-st losses to the (1_n)-th losses are calculated by referring to the (1_1)-st characteristic information to the (1_n)-th characteristic information and the (2_1)-st characteristic information to the (2_n)-th characteristic information corresponding to the (1_1)-st characteristic information to the (1_n)-th characteristic information, (ii) one of the 2-nd losses which is an average over (2_1)-st losses to (2_n)-th losses wherein the (2_1)-st losses to the (2_n)-th losses are calculated by referring to a 1-st task specific output to an n-th task specific output generated by using each piece of the (2_1)-st characteristic information to the (2_n)-th characteristic information and by further referring to at least one 1-st ground truth to at least one n-th ground truth respectively corresponding to the 1-st task specific output to the n-th task specific output, and (iii) a 3-rd loss which is an average over a 1-st sum loss to an n-th sum loss wherein each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data corresponding to the original data.

In accordance with still another aspect of the present disclosure, there is provided a data obfuscation device for concealing original data to protect personal information including: at least one memory that stores instructions; and at least one processor configured to execute the instructions to perform or support another device to perform processes of: (I) if the original data is acquired, inputting the original data or its modified data into a learning network, and allowing the learning network to (i) apply a network operation to the original data or the modified data using one or more learned parameters of the learning network and thus to (ii) output characteristic information on the original data or the modified data, and (II) updating the original data or the modified data via backpropagation using at least part of (i) one or more 1-st losses calculated by referring to the characteristic information and its corresponding at least one 1-st ground truth, and (ii) one or more 2-nd losses calculated by referring to (ii-1) at least one task specific output generated by using the characteristic information and (ii-2) at least one 2-nd ground truth corresponding to the task specific output, to thereby generate obfuscated data corresponding to the original data.

As one example, the learning network includes a 1-st learning network to an n-th learning network respectively having one or more 1-st learned parameters to one or more n-th learned parameters wherein n is an integer greater than 0, wherein, at the process of (I), the processor inputs the original data or the modified data into the 1-st learning network, and allows the 1-st learning network to (i) apply a network operation to the original data or the modified data using the 1-st learned parameters of the 1-st learning network and thus to (ii) output 1-st characteristic information on the original data or the modified data, wherein, at the process of (II), the processor updates the original data or the modified data via backpropagation using at least part of (i) one or more (1_1)-st losses calculated by referring to the 1-st characteristic information and its corresponding at least one (1_1)-st ground truth, and (ii) one or more (2_1)-st losses calculated by referring to (ii-1) at least one 1-st task specific output generated by using the 1-st characteristic information and (ii-2) at least one (2_1)-st ground truth corresponding to the 1-st task specific output, to thereby generate 1-st obfuscated data corresponding to the original data or the modified data, and wherein, while increasing an integer k from 2 to n, the processor repeats processes of (i) inputting (k−1)-th obfuscated data into a k-th learning network, and allowing the k-th learning network to (i-1) apply a network operation to the (k−1)-th obfuscated data using one or more k-th learned parameters of the k-th learning network and thus to (i-2) output k-th characteristic information on the (k−1)-th obfuscated data, and (ii) updating the (k−1)-th obfuscated data via backpropagation using at least part of (ii-1) one or more (1_k)-th losses calculated by referring to the k-th characteristic information and its corresponding at least one (1_k)-th ground truth and (ii-2) one or more (2_k)-th losses calculated by referring to at least one k-th task specific value and at least one (2_k)th ground truth wherein the k-th task specific value is generated by using the k-th characteristic information and the (2_k)-th ground truth corresponds to the k-th task specific value, to thereby generate k-th obfuscated data corresponding to the (k−1)-th obfuscated data, and wherein, as a result of the repeated processes, n-th obfuscated data which are the obfuscated data corresponding to the original data are generated.

As one example, the processor updates the original data or the modified data via backpropagation using at least part of (i) a 1-st average loss which is an average over the (1_1)-st losses to (1_n)-th losses, (ii) a 2-nd average loss which is an average over the (2_1)-st losses to (2_n)-th losses and (iii) a 3-rd average loss which is an average over a 1-st sum loss to an n-th sum loss wherein each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data.

As one example, at the process of the processor maintains the learned parameters of the learning network at constant values during the backpropagation using at least part of the 1-st losses and the 2-nd losses.

As one example, at the process of (II), the processor acquires at east one loss gradient for minimizing at least part of the 1-st losses and the 2-nd losses, and backpropagates the loss gradient to the original data or the modified data.

As one example, at the process of (I), the processor generates the modified data corresponding to the original data by performing at least one of a process of adding a random noise created by a random noise generating network to the original data, a process of blurring the original data and, a process of changing a resolution of the original data.

As one example, the learning network includes a 1-st learning network to an n-th learning network respectively having one or more 1-st learned parameters to one or more n-th learned parameters wherein n is an integer greater than 0, wherein, at the process of (I), the processor inputs the original data or the modified data into each of the 1-st learning network to the n-th learning network, and allows each of the 1-st learning network to the n-th learning network to (i) apply its corresponding network operation to the original data or the modified data using respectively the 1-st learned parameters to the n-th learned parameters of the 1-st learning network to the n-th learning network, and thus to (ii) output each piece of 1-st characteristic information to n-th characteristic information on the original data or the modified data using respectively the 1-st learned parameters to the n-th learned parameters, and wherein, at the process of (II), the processor updates the original data or the modified data via backpropagation using at least part of (i) one of the 1-st losses which is an average over (1_1)-st losses to (1_n)-th losses wherein the (1_1)-st losses to the (1_n)-th losses are calculated by referring to the 1-st characteristic information to the n-th characteristic information and at least one (1_1)-st ground truth to at least one (1_n)-th ground truth respectively corresponding to the 1-st characteristic information to the n-th characteristic information, (ii) one of the 2-nd losses which is an average over (2_1)-st losses to (2_n)-th losses wherein the (2_1)-st losses to the (2_n)-th losses are calculated by referring to a 1-st task specific output to an n-th task specific output generated by using each piece of the 1-st characteristic information to the n-th characteristic information and by further referring to at least one (2_1)-st ground truth to at least one (2_n)-th ground truth respectively corresponding to the 1-st task specific output to the n-th task specific output, and (iii) a 3-rd loss which is an average over a 1-st loss to an n-th sum loss wherein each of 1-st sun loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data corresponding to the original data.

In accordance with still yet another aspect of the present disclosure, there is provided a data obfuscation device for concealing original data to protect personal information, including: at least one memory that stores instructions; and at least one processor configured to execute the instructions to perform or support another device to perform processes of: (I) if the original data is acquired, modifying the original data, to thereby generate modified data, (II) (i) inputting the original data into a learning network, and allowing the learning network to (i-1) apply a network operation to the original data using one or more learned parameters of the learning network and thus to (i-2) output 1-st characteristic information on the original data, and (ii) inputting the modified data into the learning network, and allowing the learning network to (ii-1) apply a network operation to the modified data using the learned parameters and thus to (ii-2) output 2-nd characteristic information on the modified data, and (III) updating the original data or the modified data via backpropagation using one or more data losses created by referring to at least part of (i) one or more 1-st losses calculated by referring to the 1-st characteristic information and the 2-nd characteristic information, and (ii) one or more 2-nd losses calculated by referring to (ii-1) at least one task specific output generated by using the 2-nd characteristic information and (ii-2) at least one ground truth corresponding to the task specific output, to thereby generate obfuscated data corresponding to the original data.

As one example, the learning network includes a 1-st learning network to an n-th learning network respectively having one or more 1-st learned parameters to one or more n-th learned parameters wherein n is an integer greater than 0, wherein, at the process of (II), the processor performs processes of (i) inputting the original data into the 1-st learning network, and allowing the 1-st learning network to (i-1) apply a network operation to the original data using one or more 1-st learned parameters of the 1-st learning network and thus to (i-2) output (1_1)-st characteristic information on the original data, and (ii) inputting the modified data into the 1-st learning network, and allowing the 1-st learning network to (ii-1) apply a network operation to the modified data using the 1-st learned parameters and thus to (ii-2) output (2_1)-st characteristic information on the modified data, wherein, at the process of (c), the processor updates the modified data via backpropagation using one or more 1-st data losses calculated by referring to at least part of (i) one or more (1_1)-st losses created by referring to the (1_1)-st characteristic information and the (2_1)-st characteristic information, and (ii) one or more (2_1)-st losses created by referring to (ii-1) at least one 1-st task specific output generated by using the (2_1)-st characteristic information and (ii-2) at least one 1-st ground truth corresponding to the 1-st task specific output, to thereby generate 1-st obfuscated data corresponding to the modified data, and wherein, while increasing an integer k from 2 to n, the processor repeats processes of (i) inputting the original data into a k-th learning network, and allowing the k-th learning network to (i-1) apply a network operation to the original data using one or more k-th learned parameters of the k-th learning network and thus to (i-2) output (1_k)-th characteristic information on the original data, (ii) inputting (k−1)-th obfuscated data into the k-th learning network, and allowing the k-th learning network to (ii-1) apply a network operation to the (k−1)-th obfuscated data using the k-th learned parameters and thus to (ii-2) output (2_k)-th characteristic information on the (k−1)-th obfuscated data, and (iii) updating the (k−1)-th obfuscated data by backpropagation using one or more k-th data losses created by referring to at least part of (iii-1) one or more (1_k)-th losses calculated by referring to the (1_k)-th characteristic information and the (2_k)-th characteristic information and (iii-2) one or more (2_k)-th losses calculated by referring to at least one k-th task specific output generated by using the (2_k)-th characteristic information and at least one k-th ground truth corresponding to the k-th task specific output, to generate k-th obfuscated data corresponding to the (k−1)-th obfuscated data, and wherein, as a result of the repeated processes, n-th obfuscated data which are the obfuscated data corresponding to the original data are generated.

As one example, the processor updates the original data or the modified data via backpropagation using at least one average data loss which is an average over the 1-st data losses to the n-th data losses, to thereby generate the obfuscated data.

As one example, the processor (i) calculates, as the 1-st sub losses, at least one average loss which is an average over the (1_1)-st losses to the (1_n)-th losses, and (ii) calculates the 2-nd sub losses by referring to the specific characteristic information and an average over the (2_1)-st characteristic information to the (2_n)-th characteristic information.

As one example, at the process of (III), the processor maintains the learned parameters of the learning network at constant values during the backpropagation using the data losses.

As one example, at the process of (I), the processor generates the modified data corresponding to the original data by performing at least one of a process of adding a random noise created by a random noise generating network to the original data, a process of blurring of the original data, and a process of changing a resolution of the original data.

As one example, the learning network includes a 1-st learning network to an n-th learning network respectively having one or more 1-st learned parameters to one or more n-th learned parameters wherein n is an integer greater than 0, wherein, at the process of (II), the processor (i) inputs the original data and the modified data into each of the 1-st learning network to the n-th learning network, and (ii) allows each of the 1-st learning network to the n-th learning network to (ii-1) apply its corresponding network operation to the original data and the modified data using respectively the 1-st learned parameters to the n-th learned parameters of the 1-st learning network to the n-th learning network, thus to (ii-2) output each piece of (1_1)-st characteristic information to (1_n)-th characteristic information on the original data using respectively the 1-st learned parameters to the n-th learned parameters, and (ii-3) output each piece of (2_1)-st characteristic information to (2_n)-th characteristic information on the modified data, wherein, at the process of (III), the processor updates the original data or the modified data via backpropagation using at least part of (i) one of the 1-st losses which is an average over (1_1)-st losses to (1_n)-th losses wherein the (1_1)-st losses to the (1_n)-th losses are calculated by referring to the (1_1)-st characteristic information to the (1_n)-th characteristic information and the (2_1)-st characteristic information to the (2_n)-th characteristic information corresponding to the (1_1)-st characteristic information to the (1_n)-th characteristic information, (ii) one of the 2-nd losses which is an average over (2_1)-st losses to (2_n)-th losses wherein the (2_1)-st losses to the (2_n)-th losses are calculated by referring to a 1-st task specific output to an n-th task specific output generated by using each piece of the (2_1)-st characteristic information to the (2_n)-th characteristic information and by further referring to at least one 1-st ground truth to at least one n-th ground truth respectively corresponding to the 1-st task specific output to the n-th task specific output, and (iii) a 3-rd loss which is an average over a 1-st sum loss to an n-th sum loss wherein each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data corresponding to the original data.

In addition, recordable media that are readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
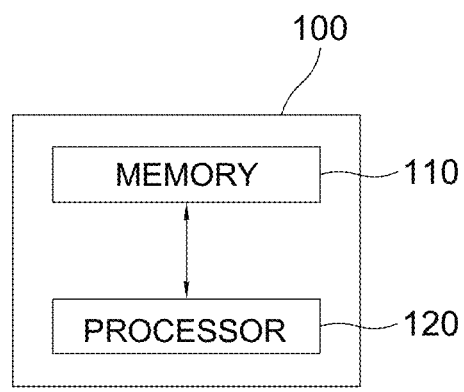
FIG. 1 is a drawing schematically illustrating a data obfuscation device for concealing data in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

To allow those skilled in the art to carry out the present disclosure easily, the example embodiments of the present disclosure will be explained in detail as shown below by referring to attached drawings.

FIG. 1 is a drawing schematically illustrating a data obfuscation device for concealing data in accordance with one example embodiment of the present disclosure.

By referring to FIG. 1, the data obfuscation device 100 in accordance with one example embodiment of the present disclosure may include a memory 110 for storing instructions to generate obfuscated data as concealed data, e.g., as anonymized data, and a processor 120 capable of performing processes for generating the obfuscated data corresponding to the original data according to the instructions in the memory 110. Herein, an output result calculated by using the obfuscated data may be same or similar to an output result calculated by using original data.

Specifically, the data obfuscation device 100 may typically achieve a desired system performance by using combinations of at least one computing device and at least one computer software, a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, according to the instructions stored in the memory 110, if the original data is acquired, the processor 120 of the data obfuscation device 100 may perform processes of (i) inputting the original data or its modified data into a learning network, and allowing the learning network to (i-1) apply a network operation to the original data or the modified data using one or more learned parameters of the learning network and thus to (i-2) output characteristic information on the original data or the modified data, and (ii) updating the original data or the modified data via backpropagation using at least part of (ii-1) one or more 1-st losses calculated by referring to the characteristic information and its corresponding at least one 1-st ground truth, and (ii-2) one or more 2-nd losses calculated by referring to at least one task specific output generated by using the characteristic information and at least one 2-nd ground truth corresponding to the task specific output, to thereby generate obfuscated data corresponding to the original data. Herein, the learning network may be a network, having its learned parameters, whose learning has been completed.

Also, according to the instructions stored in the memory 110, if the original data is acquired, the processor 120 of the data obfuscation device 100 may perform processes of (i) modifying the original data to generate the modified data, (ii) inputting the original data into the learning network, and allowing the learning network to (ii-1) apply a network operation to the original data using the learned parameters of the learning network and thus to (ii-2) output 1-st characteristic information on the original data, and (iii) inputting the modified data into the learning network, and allowing the learning network to (iii-1) a network operation to the modified data using the learned parameters and thus to (iii-2) output 2-nd characteristic information on the modified data. Thereafter, the data obfuscation device may perform processes of updating the original data or the modified data via backpropagation using one or more data losses calculated by referring to at least part of (i) one or more 1-st losses created by referring to the 1-st characteristic information and the 2-nd characteristic information, and (ii) one or more 2-nd losses created by referring to (ii-1) the task specific output generated by using the 2-nd characteristic information and (ii-2) the ground truth corresponding to the task specific output, to thereby generate the obfuscated data corresponding to the original data.

A method for concealing the original data to protect personal information by using the data obfuscation device 100 in accordance with one example embodiment of the present disclosure is described by referring to FIGS. 2 to 8 as follows.

Figure 2:
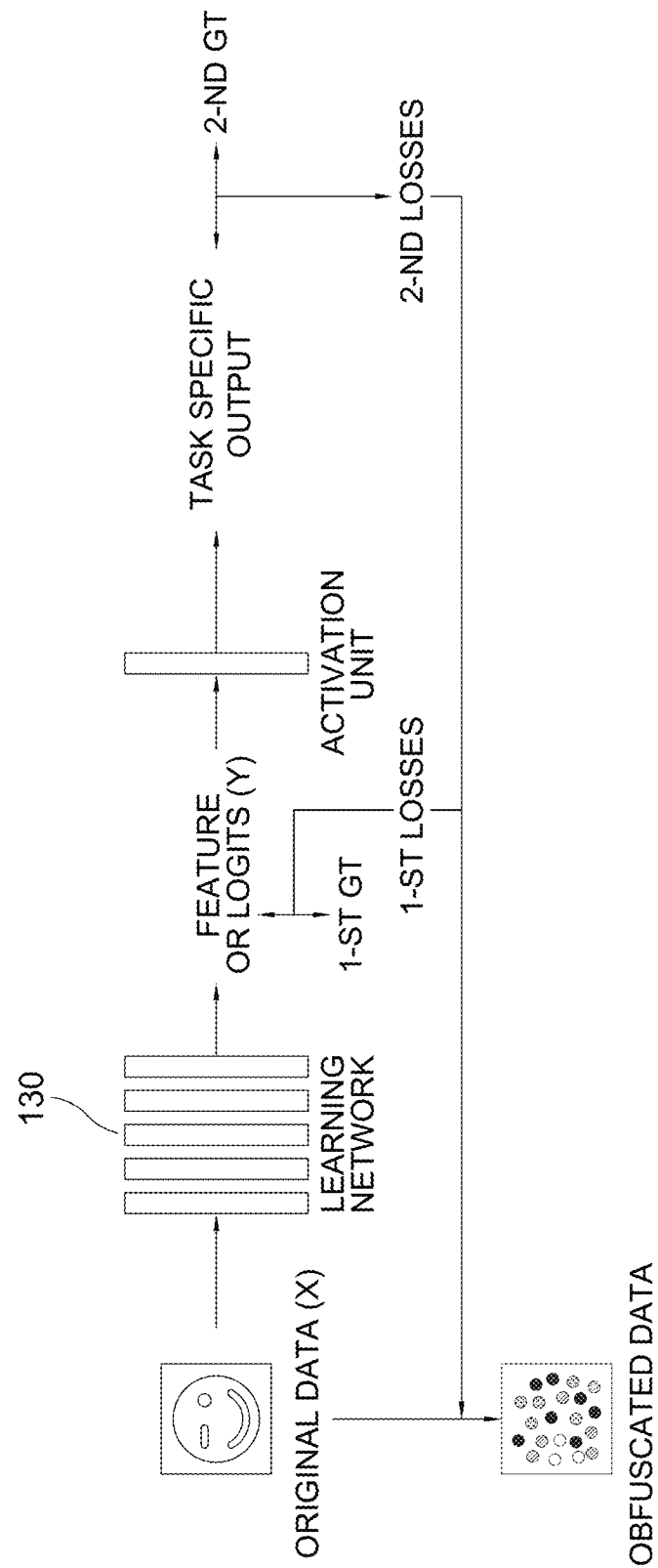
FIG. 2 is a drawing schematically illustrating a method for concealing the data in accordance with one example embodiment of the present disclosure.

FIG. 2 is a drawing schematically illustrating a method for generating the obfuscated data as a concealed data, e.g., an anonymized data. An output result calculated using the obfuscated data may be same or similar to an output result calculated using the original data, by using the learning network 130 having its learned parameters, that is, the learning network 130 having its parameters adjusted so that a desired result is outputted from training data in accordance with one example embodiment of the present disclosure.

First, if the original data x is acquired, the data obfuscation device 100 may perform processes of inputting the original data x into the learning network 130, and allowing the learning network 130 to (i) apply a network operation to the original data using one or more learned parameters of the learning network 130 and thus to (ii) output characteristic information y on the original data.

That is, according to the instructions stored in the memory 110 of the data obfuscation device 100, if the original data x for concealment is acquired, the data obfuscation device 100, i.e., the processor 120, may input the original data x into the learning network 130. Herein, the learning network 130 may include a machine learning network, but the scope of the present disclosure is not limited thereto, and may include any learning network capable of generating an output by applying a network operation using learned parameters to the inputted original data x. And, the machine learning network may include at least one of a k-Nearest Neighbors, a Linear Regression, a Logistic Regression, a Support Vector Machine (SVM), a Decision Tree and RandomRandot Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be concealed, e.g., a subject to be anonymzed, may be personal information included in the original data x. Herein, the personal information may include any information related to a person, such as personal identification information, personal medical information, personal biometric information, personal behavioral information, etc. As another example, the personal information may include sensitive information or private information such as hardward circuit diagram, business secret, etc.

Then, the learning network 130 may apply a network operation to the inputted original data x using the learned parameters of the learning network, to thereby output the characteristic information y on the original data x. Herein, the characteristic information v may be features or logits of the original data x. Also, the characteristic information y may be feature values related to certain features in the original data, or the logits including values related to at least one of vectors, matrices, and coordinates related to the certain features. For example, if the original data are facial image data, the result above may be classes for face recognition, facial features, e.g., laughing expressions, coordinates of facial landmark points, e.g., both end points on far sides of an eye.

Next, the data obfuscation device 100 may perform processes of updating the original data via backpropagation using at least part of (i) one or more 1-st losses calculated by referring to the characteristic information y and its corresponding at least one 1-st ground truth, and (ii) one or more 2-nd losses calculated by referring to (ii-1) at least one task specific output generated by using the characteristic information y and (ii-2) at least one 2-nd ground truth corresponding to the task specific output, to thereby generate the obfuscated data corresponding to the original data.

Herein, during the backpropagation using at least part of the 1-st losses and the 2-nd losses, the data obfuscation device 100 may fix and not update the learned parameters of the learning network 130, and may perform backpropagation to minimize at least part of the 1-st losses and the 2-nd losses for the original data only, to thereby obfuscate the original data. Then, the obfuscated data may be recognized as data different from the original data by a human, but may be recognized as data similar or same as the original data by the learning network.

Also, during the backpropagation using at least part of the 1-st losses and the 2-nd losses, the data obfuscation device 100 may acquire at least one loss gradient for minimizing at least part of the 1-st losses and the 2-nd losses, and may backpropagate the loss gradient to the original data.

Meanwhile, the task specific output may be an output of a task to be performed by the learning network 130, and may have various results according to the task learned by the learning network 130, such as a probability of a class for classification, coordinates resulting from regression for location detection, etc., and an activation function of an activation unit may be applied to characteristic information outputted from the learning network 130, to thereby generate the task specific output according to the task to be performed by the learning network 130. Herein, the activation function may include a sigmoid function, a linear function, a softmax function, an linear function (ReLU), a square function, a sqrt function, an srlinear function, an abs function, a tan h function, a brlinear function, etc. but the scope of the present disclosure is not limited thereto.

As one example, when the learning network 130 performs the task for the classification, the processor 120 of the data obfuscation device 100 may map the characteristic information outputted from the learning network 130 onto each of classes, to thereby generate one or more probabilities of the original data, for each of the classes. Herein, the probabilities for each of the classes may represent probabilities of the characteristic information, outputted for each of the classes from the learning network 130, being correct. For example, if the original data are the facial image data, a probability of the face having a laughing expression may be outputted as 0.75, and a probability of the face not having the laughing expression may be outputted as 0.25, and the like. Herein, a softmax algorithm may be used for mapping the characteristic information outputted from the learning network 130 onto each of the classes, but the scope of the present disclosure is not limited thereto, and various algorithms may be used for mapping the characteristic information onto each of the classes.

Figure 3:
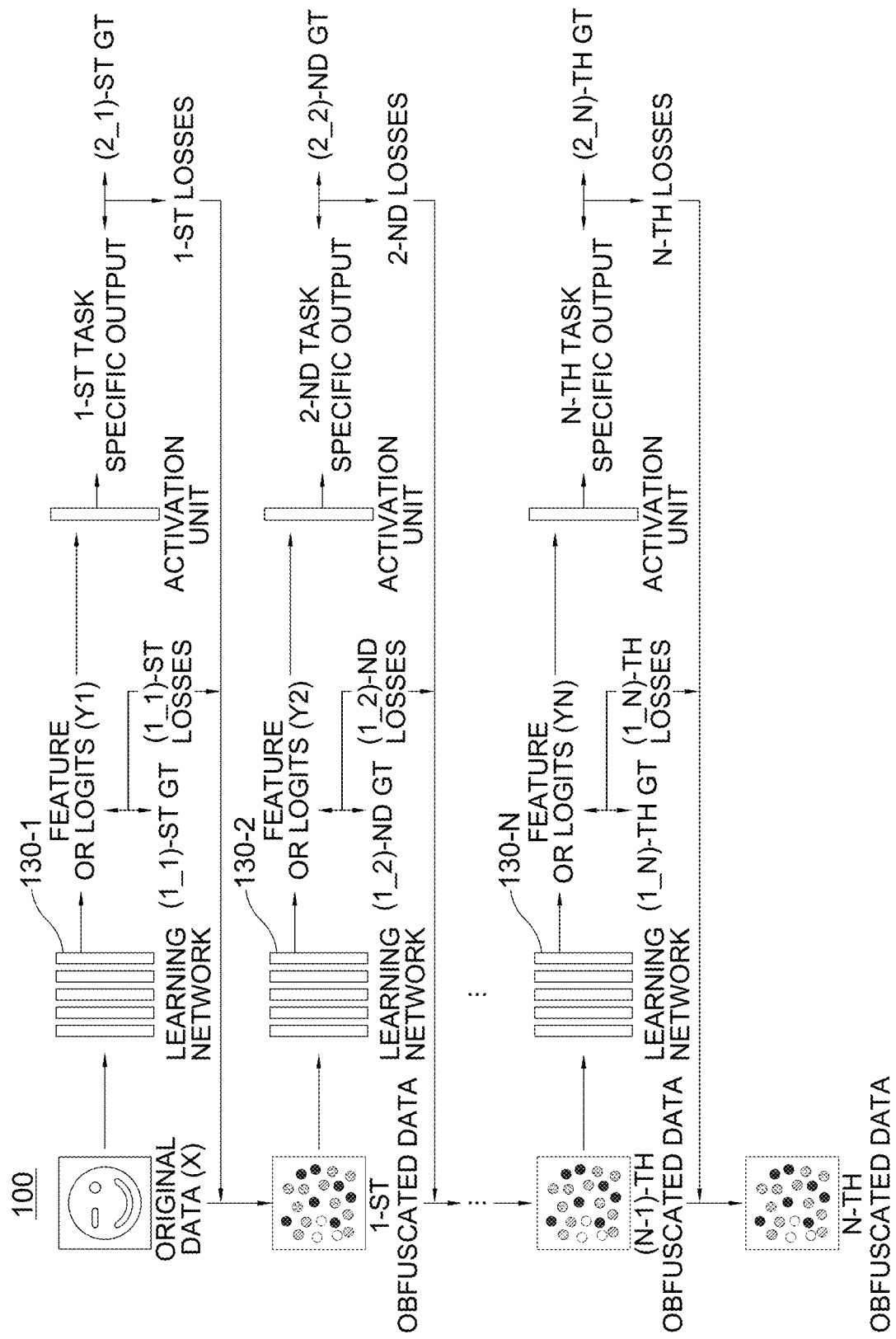
FIG. 3 is a drawing schematically illustrating another method for concealing the data in accordance with one example embodiment of the present disclosure.

FIG. 3 is a drawing schematically illustrating a method for generating the 1-st obfuscated data to the n-th obfuscated data as the concealed data. An output result calculated using the 1-st obfuscated data to the n-th obfuscated data may be same or similar to an output result calculated using the original data, by using multiple learning networks 130-1, 130-2, . . . , and 130-$n$ having their own learned parameters in accordance with the present disclosure. Herein, each of e multiple learning networks 130-1, 130-2, . . . , and 130-*n* may have completed learning to perform tasks at least part of which may be different from each other. In the description below, the part easily deducible from the explanation of FIG. 2 will be omitted.

First, if the original data x is acquired, the data obfuscation device 100 may perform processes of inputting the original data x into the 1-st learning network 130-1, and allowing the 1-st learning network 130-1 to (i) apply a network operation to the original data using one or more 1-st learned parameters of the 1-st learning network 130-1 and thus to (ii) output 1-st characteristic information y on the original data.

That is, according to the instructions stored in the memory 110 of the data obfuscation device 100, if the original data x for concealment is acquired, the data obfuscation device 100, i.e., the processor 120, may input the original data x into the 1-st learning network 130-1.

Then, the 1-st learning network 130-1 may apply a network operation to the inputted original data x using the 1-st learned parameters of the 1-st learning network, to thereby output the 1-st characteristic information y1 on the original data x.

Next, the data obfuscation device 100 may perform processes of updating the original data via backpropagation using at least part of (i) one or more (1_1)-st losses calculated by referring to the 1-st characteristic information y and its corresponding at least one (1_1)-st ground truth, and (ii) one or more (2_1)-st losses calculated by referring to (ii-1) at least one 1-st task specific output generated by using the 1-st characteristic information y1 and (ii-2) at least one (2_1)-st ground truth corresponding to the 1-st task specific output, to thereby generate 1-st obfuscated data corresponding to the original data.

Thereafter, while increasing an integer k from 2 to n, the data obfuscation device 100 may repeat processes of (i) inputting (k−1)-th obfuscated data into a k-th learning network, and allowing the k-th learning network to (i-1) apply a network operation to the (k−1)-th obfuscated data using one or more k-th learned parameters of the k-th learning network and thus to (i-2) output k-th characteristic information on the (k−1)-th obfuscated data, and (ii) updating the (k−1)-th obfuscated data via backpropagation using at least part of (ii-1) one or more (1_k)-th losses calculated by referring to the k-th characteristic information and its corresponding at least one (1_1)-th ground truth, and (ii-2) one or more (2_k)-th losses calculated by referring to (ii-2a) at least one k-th task specific output generated by using the k-th characteristic information and (ii-2b) at least one (2_k)-th ground truth corresponding to the k-th task specific output, to thereby generate k-th obfuscated data corresponding to the (k−1)-th obfuscated data.

And as such, the data obfuscation device 100 may generate n-th obfuscated data by allowing the 2-nd learning network 130-2 to the n-th learning network 130-*n* to respectively perform backpropagation with its input as previous obfuscated data created via backpropagation using each previous learning network, and thus, as a result of the repeated processes, the n-th obfuscated data which are the concealed original data may be generated.

Also, the n-th obfuscated data are generated above as the obfuscated data which are the concealed original data, however, the obfuscated data may be generated by allowing the 1-st learning network 130-1 to the n-th learning network 130-*n* to use the (1_1)-st losses to the (1_n)-th losses and the (2_1)-st losses to the (2_n)-th losses to update the original data and conceal the original data.

That is, using the 1-st learning network 130-1 to the n-th learning network 130-*n* as above, the data obfuscation device 100 may update the original data via backpropagation using at least part of (i) a 1-st average loss which is an average over the (1_1)-st losses to the (1_n)-th losses (ii) a 2-nd average loss which is an average over the (2_1)-st losses to the (2_n)-th losses and (iii) a 3-rd average loss which is an average over a 1-st sum loss to an n-th sum loss wherein each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data which are the concealed original data.

Meanwhile, the data obfuscation device 100 is shown above as generating the obfuscated data by allowing each of the 2-nd learning network 130-2 to the n-th learning network 130-*n* to perform backpropagation with its input as previous obfuscated data created via backpropagation using each previous learning network, however, the original data x may be inputted respectively into the 1-st learning network 130-1 to the n-th learning network 130-*n*, to thereby generate the obfuscated data with a single backpropagation.

That is, the data obfuscation device 100 may input the original data x into each of the 1-st learning network 130-1 to the n-th learning network 130-*n*, and allow each of the 1-st learning network 130-1 to the n-th learning network 130-*n* to (i) apply its corresponding network operation to the original data x using respectively the 1-st learned parameters to the n-th learned parameters of the 1-st learning network 130-1 to the n-th learning network 130-*n*, and thus to (ii) output each piece of the 1-st characteristic information to the n-th characteristic information on the original data x using respectively the 1-st learned parameters to the n-th learned parameters. Next, the data obfuscation device 100 may update the original data via backpropagation using the 1-st loss which is an average over the (1_1)-st losses to the (1_n)-th losses calculated by referring to (i) the 1-st characteristic information to the n-th characteristic information and (ii) the (1_1)-st ground truth to the (1_n)-th ground truth corresponding respectively to the 1-st characteristic information to the n-th characteristic information, to thereby generate the obfuscated data corresponding to the original data.

Also, the data obfuscation device 100 may update the original data via backpropagation using the 2-nd loss which is an average over the (2_1)-st losses to the (2_n)-th losses calculated by referring to (i) the 1-st task specific output to the n-th task specific output generated by using each piece of the 1-st characteristic information to the n-th characteristic information and (ii) at least one (2_1)-st ground truth to at least one (2_n)-th ground truth respectively corresponding to the 1-st task specific output to the n-th task specific output, to thereby generate the obfuscated data corresponding to the original data.

In addition to this, the data obfuscation device 100 may update the original data via backpropagation using the 3-rd loss which is an average over the 1-st sum loss to the n-th sum loss where each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data corresponding to the original data.

Figure 4:
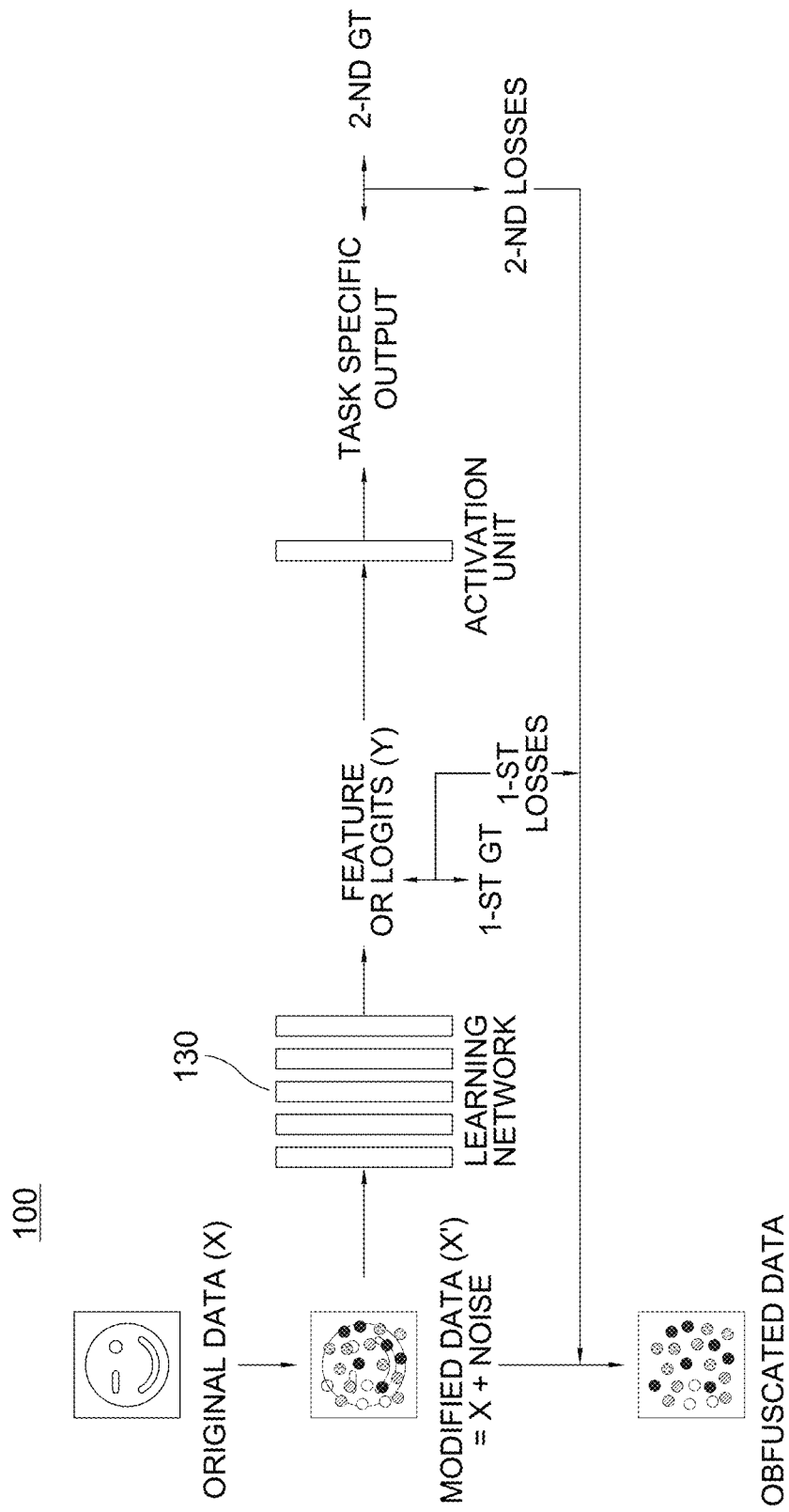
FIG. 4 is a drawing schematically illustrating a method for concealing the data in accordance with another example embodiment of the present disclosure.

FIG. 4 is a drawing schematically illustrating a method for generating the obfuscated data as the concealed data, where the obfuscated data, corresponding to the original data, is created, with the modified data as an input which is generated by modifying the original data, in accordance with another example embodiment of the present disclosure. In the description below, the part easily deducible from the explanation of FIG. 2 will be omitted.

First, if the original data x is acquired, the data obfuscation device 100 may modify the original data x, to thereby generate the modified data x'.

Herein, the modified data x' may be generated by adding at least one random noise created through a random noise generating network (not illustrated) to the original data x. As one example, the random noise generating network may be instructed to generate the random noise having a normal distribution $N(0, \sigma)$, and the generated noise may be added to the original data x, to thereby generate the modified data x'. Also, the modified data x' may be generated by blurring the original data x, or changing a resolution of the original data x, as well as using the random noise, but the scope of the present disclosure is not limited thereto, and various ways of modifying the original data may be used.

Next, the data obfuscation device 100 may input the modified data x' into the learning network 130, and allow the learning network 130 to (i) apply a network operation to the modified data using the learned parameters of the learning network 130 and thus to (ii) output characteristic information y on the modified data.

That is, according to the instructions stored in the memory 110 of the data obfuscation device 100, if the original data x for concealment is acquired, the data obfuscation device 100, i.e., the processor 120, may modify the original data x into the modified data x' and then input the modified data x' into the learning network 130.

Then, the learning network 130 may apply a network operation to the inputted modified data x' using the learned parameters of the learning network, to thereby output the characteristic information y on the modified data x'.

Next, the data obfuscation device 100 may perform processes of updating the original data or the modified data via backpropagation using at least part of (i) the 1-st losses calculated by referring to the characteristic information y and its corresponding at least one 1-st ground truth, and (ii) the 2-nd losses calculated by referring to (ii-1) the task specific output generated by using the characteristic information y and (ii-2) at least one 2-nd ground truth corresponding to the task specific output, to thereby generate the obfuscated data corresponding to the original data.

Figure 5:
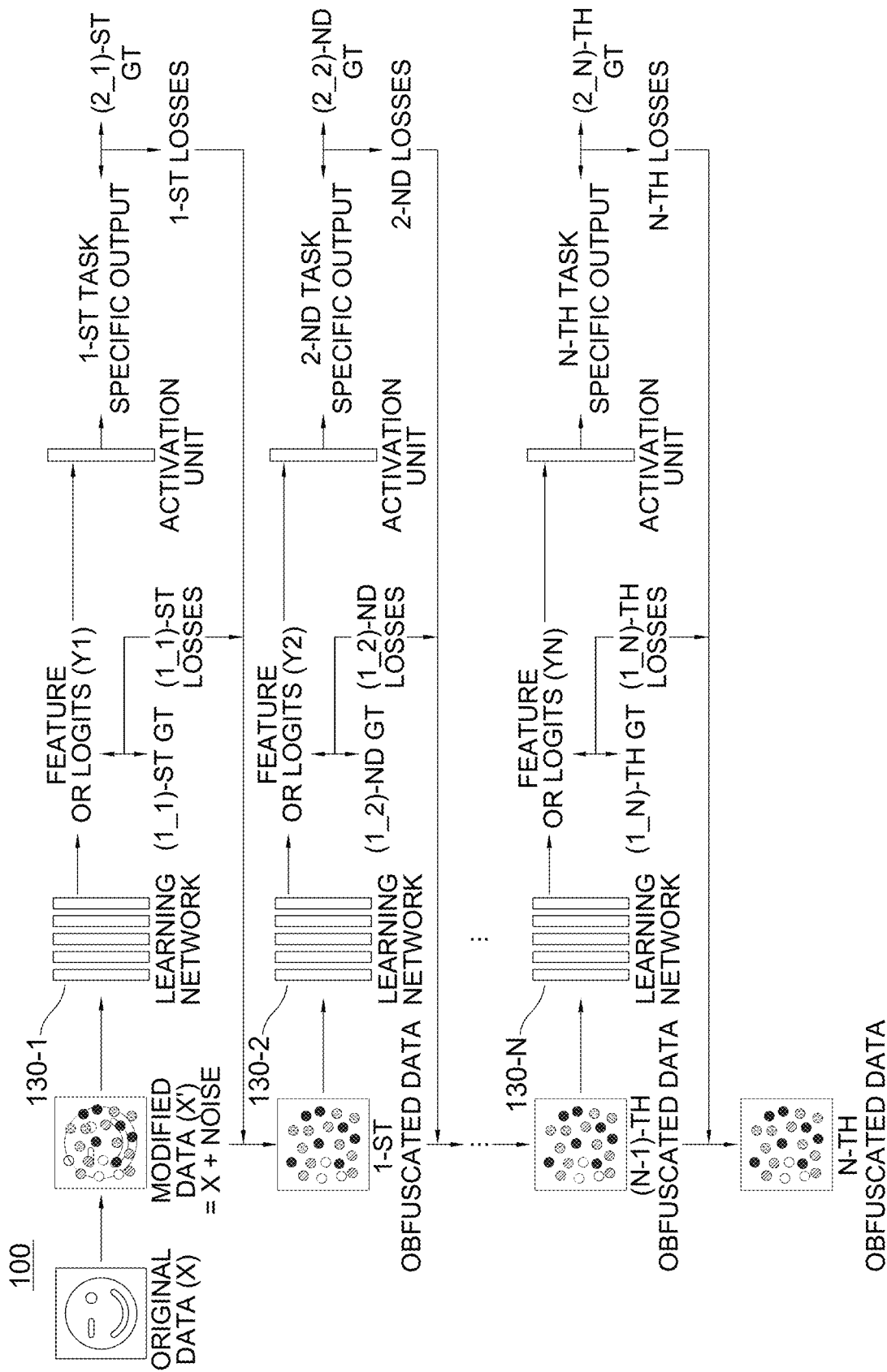
FIG. 5 is a drawing schematically illustrating another method for concealing the data in accordance with another example embodiment of the present disclosure.

FIG. 5 is a drawing schematically illustrating a method for generating the 1-st obfuscated data to the n-th obfuscated data as the concealed data, where the obfuscated data, corresponding to the original data, are created, with the modified data as an input which are generated by modifying the original data, in accordance with another example embodiment of the present disclosure. In the description below, the part easily deducible from the explanation of FIGS. 2 to 4 will be omitted.

First, if the original data x is acquired, the data obfuscation device 100 may modify the original data x, to thereby generate the modified data x'.

Next, the data obfuscation device 100 may input the modified data x' into the 1-st learning network 130-1, and allow the 1-st learning network 130-1 to (i) apply a network operation to the modified data using the 1-st learned parameters of the 1-st learning network 130-1 and thus to output 1-st characteristic information y on the modified data.

That is, according to the instructions stored in the memory 110 of the data obfuscation device 100, if the original data x for concealment is acquired, the data obfuscation device 100, i.e., the processor 120, may modify the original data x into the modified data x' and then input the modified data x' into the 1-st learning network 130-1.

Then, the 1-st learning network 130-1 may apply a network operation to the inputted modified data x' using the 1-st learned parameters of the 1-st learning network, to thereby output the 1-st characteristic information y1 on the modified data x'.

Next, the data obfuscation device 100 may perform processes of updating the modified data via backpropagation using at least part of (i) one or more (1_1)-st losses calculated by referring to the 1-st characteristic information y1 and its corresponding at least one (1_1)-st ground truth, and (ii) one or more (2_1)-st losses calculated by referring to (ii-1) at least one 1-st task specific output generated by using the 1-st characteristic information y1 and (ii-2) at least one (2_1)-st ground truth corresponding to the 1-st task specific output, to thereby generate 1-st obfuscated data corresponding to the modified data.

Thereafter, while increasing an integer k from 2 to n, the data obfuscation device 100 may repeat processes of (i) inputting (k−1)-th obfuscated data into a k-th learning network, and allowing the k-th learning network to (i-1) apply a network operation to the (k−1)-th obfuscated data using one or more k-th learned parameters of the k-th learning network and thus to (i-2) out k-th characteristic information on the (k−1)-th obfuscated data, and (ii) updating the (k−1)-th obfuscated data via backpropagation using at least part of (ii-1) one or more (1_k)-th losses calculated by referring to the k-th characteristic information and its corresponding at least one (1_k)-th ground truth, and (ii-2) one or more (2_k)-th losses calculated by referring to (ii-2a) at least one k-th task specific output generated by using the k-th characteristic information and (ii-2b) at least one (2_k)-th ground truth corresponding to the k-th task specific output, to thereby generate k-th obfuscated data corresponding to the (k−1)-th obfuscated data.

And as such, the data obfuscation device 100 may generate n-th obfuscated data by allowing the 2-nd learning network 130-2 to the n-th learning network 130-n to respectively perform backpropagation with its input as previous obfuscated data created via backpropagation using each previous learning network, and thus, as a result of the repeated processes, the n-th obfuscated data which are the concealed original data may be generated.

Also, the n-th obfuscated data are generated above as the obfuscated data which are the concealed original data, however, the obfuscated data may be generated by allowing the 1-st learning network 130-1 to the n-th learning network 130-n to use the (1_1)-st losses to the (1_n)-th losses and the (2_1)-st losses to the (2_n)-th losses to update the original data or the modified data and conceal the original data.

That is, using the 1-st learning network 130-1 to the n-th learning network 130-n as above, the data obfuscation device 100 may update the original data or the modified data via backpropagation using at least part of (i) the 1-st average loss which is an average over the (1_1)-st losses to the (1_n)-th losses (ii) the 2-nd average loss which is an average over the (2_1)-st losses to the (2_n)-th losses and (iii) the 3-rd average loss which is an average over the 1-st sum loss to the n-th sum loss wherein each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data which are the concealed original data.

Meanwhile, the data obfuscation device 100 is shown above as generating the obfuscated data by allowing each of the 2-nd learning network 130-2 to the n-th learning network 130-n to respectively perform backpropagation with its input as previous obfuscated data created via backpropagation using each previous learning network, however, the modified data may be inputted respectively into the 1-st learning network 130-1 to the n-th learning network 130-n, to thereby generate the obfuscated data with a single backpropagation.

That is, the data obfuscation device 100 may input the modified data x' into each of the 1-st learning network 130-1 to the n-th learning network 130-n, and allow each of the 1-st learning network 130-1 to the n-th learning network 130-n to (i) apply its corresponding network operation to the modified data x' using respectively the 1-st learned parameters to the n-th learned parameters of the 1-st learning network 130-1 to the n-th learning network 130-n, and thus to (ii) output each piece of the 1-st characteristic information to the n-th characteristic information on the modified data x'. Next, the data obfuscation device 100 may update the original data or the modified via backpropagation using the 1-st loss which is an average over the (1_1)-st losses to the (1_n)-th losses calculated by referring to (i) the 1-st characteristic information to the n-th characteristic information and (ii) the (1_1)-st ground truth to the (1_n)-th ground truth corresponding respectively to the 1-st characteristic information to the n-th characteristic information, to thereby generate the obfuscated data corresponding to the original data.

Also, the data obfuscation device 100 may update the original data or the modified data via backpropagation using the 2-nd loss which is an average over the (2_1)-st losses to the (2_n)-th losses calculated by referring to (i) the 1-st task specific output to the n-th task specific output generated by using each piece of the 1-st characteristic information to the n-th characteristic information and (ii) at least one (2_1)-st ground truth to at least one (2_n)-th around truth respectively corresponding to the 1-st task specific output to the n-th task specific output, to thereby generate the obfuscated data corresponding to the original data.

In addition to this, the data obfuscation device 100 may update the original data or the modified data via backpropagation using the 3-rd loss which is an average over the 1-st sum loss to the n-th sum loss where each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data corresponding to the original data.

Figure 6:
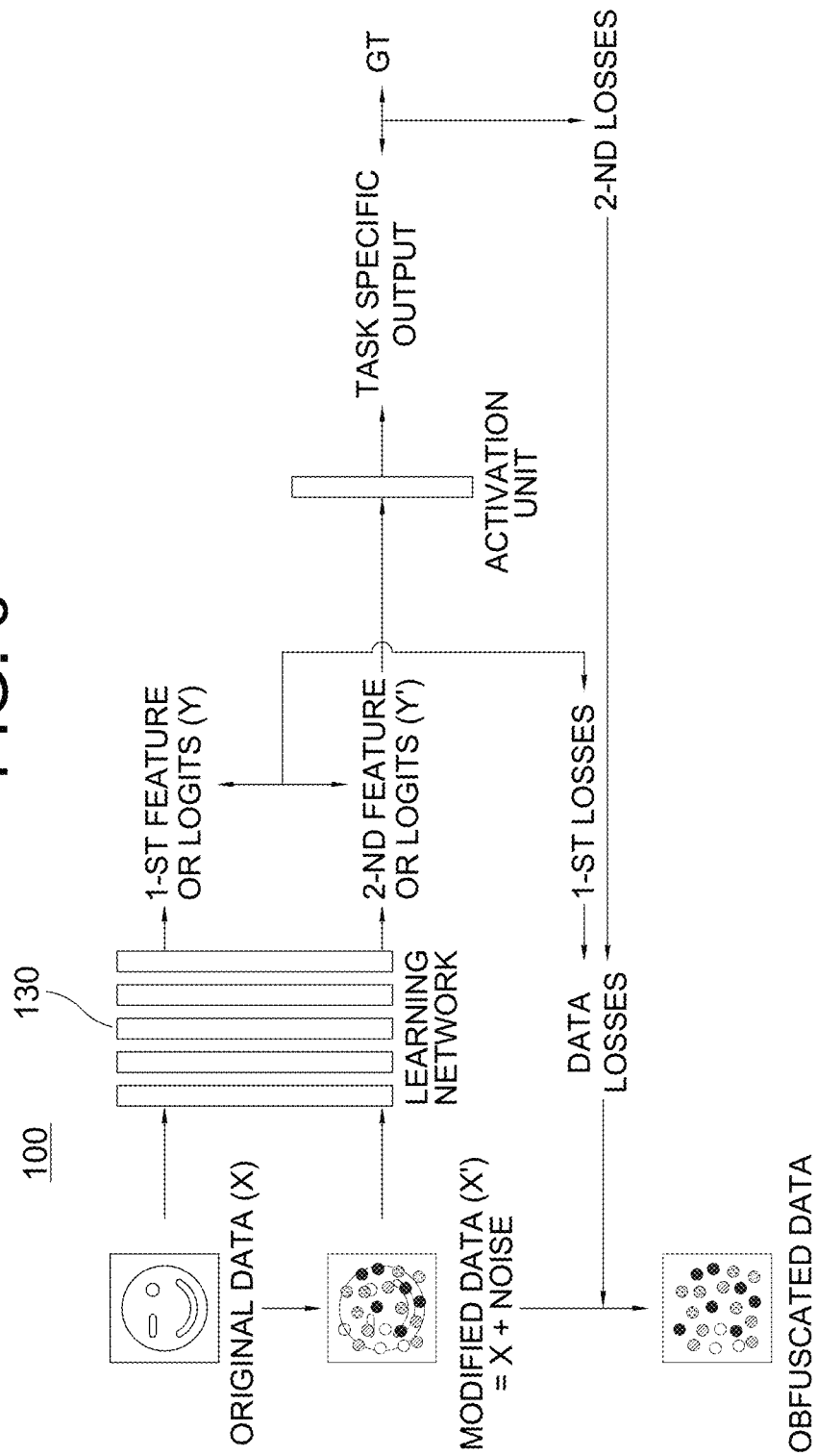
FIG. 6 is a drawing schematically illustrating a method for concealing the data in accordance with still another example embodiment of the present disclosure.

FIG. 6 is a drawing schematically illustrating a method for concealing the data in accordance with still another example embodiment of the present disclosure. In the description below, the part easily deducible from the explanation of FIGS. 2 to 5 will be omitted.

First, if the original data x is acquired, the data obfuscation device 100 may modify the original data x, to thereby generate the modified data x'.

Next, the data obfuscation device 100 may input the original data x into the learning network 130, and allow the learning network 130 to (i) apply a network operation to the original data x using one or more learned parameters of the learning network 130 and thus to (ii) output 1-st characteristic information y on the original data. Also, the data obfuscation device 100 may input the modified data x' into the learning network 130, and allow the learning network 130 to (i) apply a network operation to the modified data x' using the learned parameters and thus to (ii) output 2-nd characteristic information y' on the modified data x'.

Next, the data obfuscation device 100 may update the original data x or the modified data x' via backpropagation using the data losses calculated by referring to at least part of (i) one or more 1-st losses created by referring to the 1-st characteristic information y and the 2-nd characteristic information y', and (ii) one or more 2-nd losses created by referring to (ii-1) at least one task specific output generated by using the 2-nd characteristic information y' and (ii-2) at least one ground truth corresponding to the task specific output, to thereby generate the obfuscated data corresponding to the original data.

Herein, when calculating the 1-st losses by referring to the 1-st characteristic information and the 2-nd characteristic information, the data obfuscation device 100 may calculate the 1-st losses by using a difference, e.g., a norm $\|y\text{-}y'\|$, between the 1-st characteristic information and the 2-nd characteristic information, or may calculate the 1-st losses by using a cosine similarity between the 1-st characteristic information and the 2-nd characteristic information, but the scope of the present disclosure is not limited thereto.

Also, during the backpropagation using the data losses, the data obfuscation device 100 may fix and not update the learned parameters of the learning network 130, and may perform backpropagation to minimize at least part of the 1-st losses and the 2-nd losses for the original data or the modified data only, to thereby obfuscate the original data. Then, the obfuscated data may be recognized as data different from the original data by a human, but may be recognized as data similar or same as the original data by the learning network.

Also, during the backpropagation using the data losses, the data obfuscation device 100 may acquire at least one loss gradient for minimizing at least part of the 1-st losses and the 2-nd losses by using the data losses, and may backpropagate the loss gradient to the original data.

Figure 7:
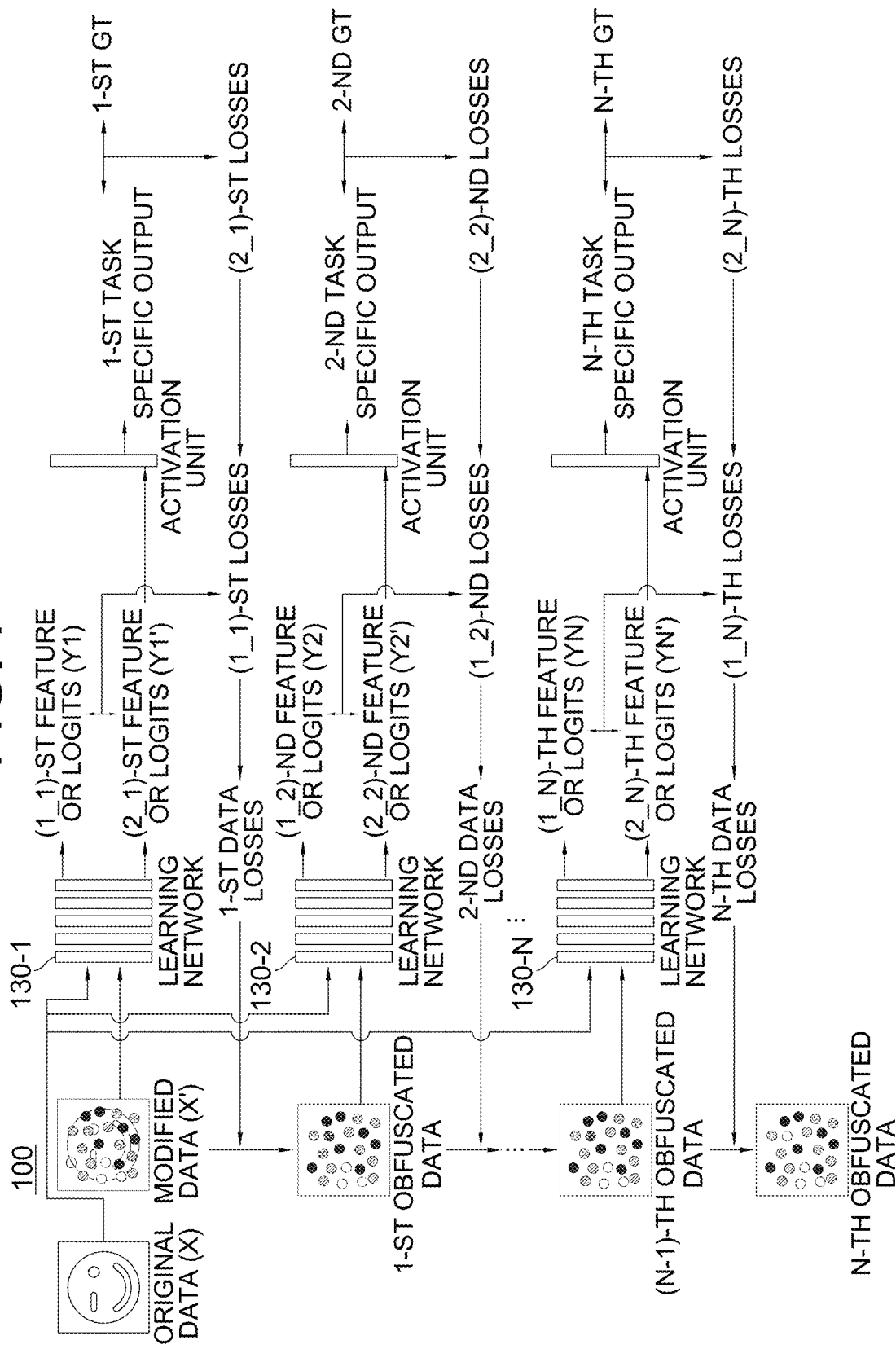
FIG. 7 is a drawing schematically illustrating another method for concealing the data in accordance with still another example embodiment of the present disclosure.

FIG. 7 is a drawing schematically illustrating a method for generating the 1-st obfuscated data to the n-th obfuscated data as the concealed data. An output result calculated using the obfuscated data may be same or similar to an output result calculated using the original data, by using multiple learning networks 130-1, 130-2, ..., and 130-n having their own learned parameters in accordance with still another example embodiment of the present disclosure. In the description below, the part easily deducible from the explanation of FIGS. 2 to 6 will be omitted.

First, if the original data x is acquired, the data obfuscation device 100 may modify the original data x, to thereby generate the modified data x'.

Next, the data obfuscation device 100 may input the original data x into the 1-st learning network 130-1, and allow the 1-st learning network 130-1 to (i) apply a network operation to the original data x using the 1-st learned parameters of the 1-st learning network 130-1 and thus to (ii) output (1_1)-st characteristic information y1 on the original data. Also, the data obfuscation device 100 may input the modified data x' into the 1-st learning network 130-1, and allow the 1-st learning network 130-1 to (i) apply a network operation to the modified data x' using the learned parameters and thus to (ii) output (2_1)-st characteristic information y1' on the modified data x'.

Next, the data obfuscation device 100 may update the modified data x' via backpropagation using the 1-st data losses calculated by referring to at least part of (i) one or more (1_1)-st losses created by referring to the (1_1)-st characteristic information y1 and the (2_1)-st characteristic information y1', and (ii) one or more (2_1)-st losses created by referring to (ii-1) at least one 1-st task specific output generated by using the (2_1)-st characteristic information y1' and (ii-2) at least one 1-st ground truth corresponding to the 1-st task specific output, to thereby generate the 1-st obfuscated data.

Thereafter, while increasing integer k from 2 to n, the data obfuscation device 100 may repeat processes of (i) inputting the original data x into the k-th learning network, and allowing the k-th learning network to (i-1) apply a network operation to the original data x using the k-th learned parameters of the k-th learning network and thus to (i-2) output (1_k)-th characteristic information yk on the original data, (ii) inputting (k−1)-th obfuscated data into the k-th learning network, and allowing the k-th learning network to (ii-1) apply a network operation to the (k−1)-th obfuscated data using the k-th learned parameters of the k-th learning network and thus to (ii-2) output (2_k)-th characteristic information yk' on the (k−1)-th obfuscated data, and (iii) updating the (k−1)-th obfuscated data via backpropagation using one or more k-th data losses calculated by referring to at least part of (iii-1) one or more (1_k)-th losses created by referring to the (1_k)-th characteristic information yk and the (2_k)-th characteristic information yk', and (iii-2) one or more (2_k)-th losses created by referring to (iii-2a) at least one k-th task specific output generated by using the (2_k)-th characteristic information yk' and (iii-2b) at least one k-th ground truth corresponding to the k-th task specific output, to thereby generate the k-th obfuscated data corresponding to the (k−1)-th obfuscated data, and thus, as a result of the repeated processes, the n-th obfuscated data, which are the obfuscated data corresponding to the original data, may be generated.

Also, the n-th obfuscated data are generated above as the obfuscated data which are the concealed original data, however, the obfuscated data may be generated by concealing the original data through updating the original data or the modified data via allowing the 1-st learning network 130-1 to the n-th learning network 130-n to use the 1-st data losses to the n-th data losses.

That is, via the processes above, the data obfuscation device 100 may (i) acquire the 1-st data losses to the n-th data losses through the 1-st learning network 130-1 and the n-th learning network 130-n, and (ii) update the original data or the modified data via backpropagation using at least one average data loss which is an average over the acquired 1-st data losses to the acquired n-th data losses, to thereby generate the obfuscated data which are the concealed original data.

Also, the original data are shown above as inputted respectively into the 1-st learning network 130-1 to the n-th learning network 130-n, to thereby acquire the characteristic information on the original data, and the (1_1)-st losses to the (1_n)-th losses are shown as calculated using the characteristic information, however, the original data may be inputted into at least one specific learning network among the 1-st learning network 130-1 to the n-th learning network 130-n, to thereby acquire specific characteristic information on the original data, and the original data or the modified data may be updated using the specific characteristic information.

As one example, the data obfuscation device 100 may allow the at least one specific leaning network among the 1-st learning network 130-1 to the n-th learning network 130-n to (i) apply its corresponding network operation to the original data x using one or more specific learned parameters of the specific learning network and thus to (ii) output the specific characteristic information on the original data.

And, the data obfuscation device 100 may (i) input the modified data x' into the 1-st learning network 130-1, and allow the 1-st learning network 130-1 to (i-1) apply a network operation to the modified data using the 1-st learned parameters, and thus (i-2) output (2_1)-st characteristic information on the modified data, (ii) calculate the (1_1)-st losses by referring to one or more 1-st probabilities of the modified data and at least one ground truth where the 1-st probabilities of the modified data are generated by mapping the (2_1)-st characteristic information onto each of the classes and where the ground truth corresponds to the original data, and (iii) update the modified data via backpropagation using the (1_1)-st losses, to thereby generate the 1-st obfuscated data corresponding to the modified data. And, while increasing an integer k from 2 to n, the data obfuscation device 100 may repeat processes of (i) inputting the (k−1)-th obfuscated data into the k-th learning network, and allowing the k-th learning network to (i-1) apply a network operation to the (k−1)-th obfuscated data using the k-th learned parameters of the k-th learning network and thus to (i-2) output (2_k)-th characteristic information on the (k−1)-th obfuscated data, (ii) calculating the (1_k)-th losses by referring to one or more k-th probabilities of the (k−1)-th obfuscated data and at least one ground truth corresponding to the original data where the k-th probabilities of the (k−1)-th obfuscated data are generated by mapping the (2_k)-th characteristic information onto each of the classes, and (iii) updating the (k−1)-th obfuscated data via backpropagation using the (1_k)-th losses, to thereby generate the k-th obfuscated data corresponding to the (k−1)-th obfuscated data. And thus, as a result of the repeated processes, the n-th obfuscated data may be generated.

Thereafter, the data obfuscation device 100 may update the original data or the modified data, by using at least part of (i) one or more 1-st sub losses calculated by referring to the (1_1)-st losses to the (1_n)-th losses and (ii) one or more 2-nd sub losses calculated by referring to (ii-1) the specific characteristic information and (ii-2) the (2_1)-st characteristic information to the (2_n)-th characteristic information, to thereby generate the obfuscated data corresponding to the original data.

Herein, the data obfuscation device 100 may (i) calculate, as the 1-st sub losses, at least one average loss which is an average over the (1_1)-st losses to the (1_n)-th losses, and (ii) calculate the 2-nd sub losses by referring to the specific characteristic information and an average over the (2_1)-st characteristic information to the (2_n)-th characteristic information.

Meanwhile, the data obfuscation device 100 is shown above as generating the obfuscated data by allowing each of the 2-nd learning network 130-2 to the n-th learning network 130-n to respectively perform backpropagation with its input as previous obfuscated data created via backpropagation using each previous learning network, however, the modified data x' may be inputted respectively into the 1-st learning network 130-1 to the n-th learning network 130-n, to thereby generate the obfuscated data with a single backpropagation.

That is, the data obfuscation device 100 may input the original data x into each of the 1-st learning network 130-1 to the n-th learning network 130-n, and allow each of the 1-st learning network 130-1 to the n-th learning network 130-n to (i) apply its corresponding network operation to the original data x using respectively the 1-st learned parameters to the n-th learned parameters of the 1-st learning network 130-1 to the learning network 130-n, and thus to (ii) output each piece of the (1_1)-st characteristic information y1 to the (1_n)-th characteristic information yn on the original data x. Also, data obfuscation device 100 may input the modified data x' into each of the 1-st learning network 130-1 to the n-th learning network 130-n, and allow each of the 1-st learning network 130-1 to the n-th learning network 130-n to (i) apply its corresponding network operation to the modified data x' using respectively the 1-st learned parameters to the n-th learned parameters of the 1-st learning network 130-1 to the n-th learning network 130-n, and thus to output each piece of the (2_1)-st characteristic information y1' to the (2_n)-th characteristic information yn' on the modified data x' using respectively the 1-st learned parameters to the n-th learned parameters.

And, the data obfuscation device 100 may update the original data or the modified via backpropagation using the 1-st loss which is an average over the (1_1)-st losses to the (1_n)-th losses calculated by referring to (i) the (1_1)-st characteristic information to the (1_n)-th characteristic information and (ii) the (2_1)-st characteristic information to the (2_n)-th characteristic information corresponding respectively to the (1_1)-st characteristic information to the (1_n)-th characteristic information, to thereby generate the obfuscated data corresponding to the original data.

Also, the data obfuscation device 100 may update the original data or the modified data via backpropagation using the 2-nd loss which is an average over the (2_1)-st losses to the (2_n)-th losses calculated by referring to (i) the 1-st task specific output to the n-th task specific output generated by using each piece of the (2_1)-st characteristic information to the (2_n)-th characteristic information and (ii) at least one 1-st ground truth to at least one n-th ground truth respectively corresponding to the 1-st task specific output to the n-th task specific output, to thereby generate the obfuscated data corresponding to the original data.

In addition to this, the data obfuscation device 100 may update the original data or the modified data via backpropagation using the 3-rd loss which is an average over the 1-st sum loss to the n-th sum loss where each of the 1-st sum loss to the n-th sum loss is each piecewise summation of the (1_1)-st losses to the (1_n)-th losses and the (2_1)-st losses to the (2_n)-th losses corresponding to the (1_1)-st losses to the (1_n)-th losses, to thereby generate the obfuscated data corresponding to the original data.

Figure 8A:
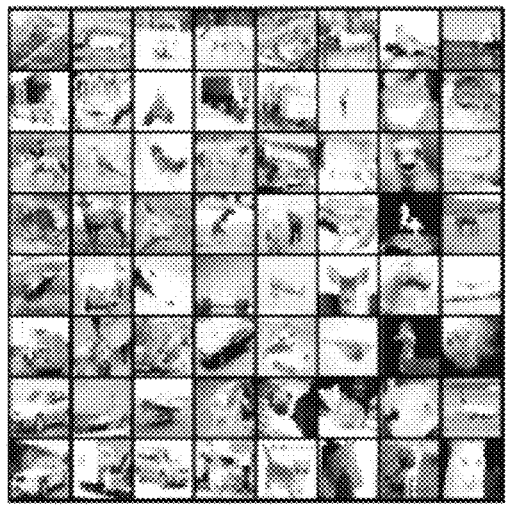
FIGS. 8A and 8B are drawings schematically illustrating original data and concealed original data in accordance with the present disclosure.
Figure 8B:
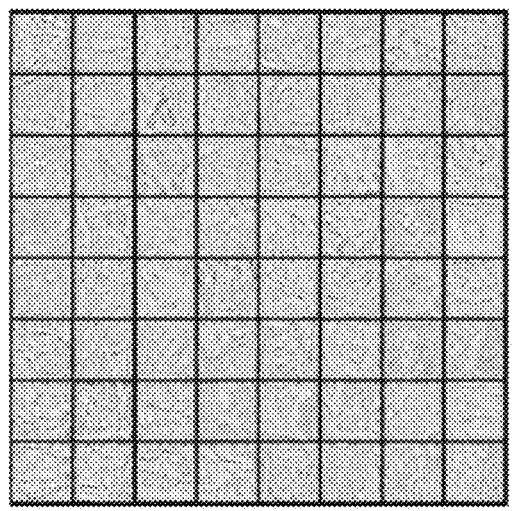

FIGS. 8A and 8B are drawings schematically illustrating the original data and the concealed original data in accordance with the present disclosure.

FIG. 8A is a drawing exemplarily illustrating 64 image samples selected from the CIFAR-10 dataset which includes images collected and labeled by Canadian institute for Advanced Research (CIFAR) for image classification.

The obfuscated data generated by concealing the image samples, as the original data in FIG. 8A in accordance with example embodiments of the present disclosure, are shown FIG. 8B.

By referring to FIGS. 8A and 8B, the 64 obfuscated data in FIG. 8B which are concealed in accordance with the present disclosure are visually different from the 64 original data in FIG. 8A, but if the 64 obfuscated data are inputted into the learning network, the learning network outputs a result same or similar to that of the original data.

Meanwhile, the obfuscated data which are concealed by the data obfuscation device 100 in accordance with example embodiments of the present disclosure may be provided or sold to a buyer of image big data.

Also, in accordance with example embodiments of the present disclosure, when the concealed image data are provided or sold to the buyer, the method of the data obfuscation device 100 may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby generate concealed data from original data owned by the buyer or acquired from other sources, and use the concealed data for his/her own learning network. Also, the buyer may use at least two of the concealed data, the original image data owned by the buyer or acquired from other sources, and the concealed image data provided or sold to the buyer, together for the buyer's learning network.

Meanwhile, in accordance with one example embodiment of the present disclosure, if the method of the data obfuscation device 100 is implemented as the program instructions that can be executed by a variety of computer components, then computational overhead may occur in the computing devices of the buyer when the accuracy is set as high, thus the buyer is allowed to lower the accuracy to prevent the computational overhead.

Meanwhile, the "average" mentioned in this specification may represent a weighted average but it is not limited thereto.

The present disclosure has an effect of performing concealment in a simple and accurate way, since processes of finding personal identification information in data are eliminated.

The present disclosure has another effect of protecting privacy and security of the original data by generating irreversibly obfuscated and concealed data from the original data.

The present disclosure has still another effect of generating data recognized as similar or same by a computer but recognized as different by a human.

The present disclosure has still yet another effect of stimulating a big data trade market.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed carry out program commands. Program commands may include not only a machine language code made by a complier hut also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure s not be confined to the explained embodiments, and the following patent claims as well as everything including variations equal or equivalent to the patent claims pertain to the category of the thought of the present disclosure.

What is claimed is:

1. A method for concealing original data to protect personal information, a concealed data being recognized as similar or same as the original data by a computer but different by a human, comprising steps of:
   (a) a data obfuscation device, on condition that the original data is acquired, inputting the original data or its modified data into a learning network, and allowing the learning network to (i) apply a network operation to the original data or the modified data using one or more learned parameters of the learning network and thus to (ii) output characteristic information on the original data or the modified data, the characteristic information being at least one of features and logits of the original data or modified data; and
   (b) the data obfuscation device updating the original data or the modified data via backpropagation using at least part of (i) one or more 1-st losses calculated by referring to the characteristic information and its corresponding at least one 1-st ground truth, and (ii) one or more 2-nd losses calculated by referring to (ii-1) at least one task specific output generated by using the characteristic information and (ii-2) at least one 2-nd ground truth corresponding to the task specific output, to thereby generate obfuscated data corresponding to the original data, wherein
   (b) includes maintaining the learned parameters during the backpropagation regardless of resultant calculated losses, wherein the learning network includes a 1-st learning network to an n-th learning network respectively having one or more 1-st learned parameters to one or more n-th learned parameters wherein n is an integer greater than 0,
   wherein, at the step of (a), the data obfuscation device inputs the original data or the modified data into the 1-st learning network, and allows the 1-st learning network to (i) apply a network operation to the original data or the modified data using the 1-st learned parameters of the 1-st learning network and thus to (ii) output 1-st characteristic information on the original data or the modified data,
   wherein, at the step of (b), the data obfuscation device updates the original data or the modified data via backpropagation using at least part of (i) one or more $(1\_1)$-st losses calculated by referring to the 1-st characteristic information and its corresponding at least one $(1\_1)$-st ground truth, and (ii) one or more $(2\_1)$-st losses calculated by referring to (ii-1) at least one 1-st task specific output generated by using the 1-st characteristic information and (ii-2) at least one $(2\_1)$-st ground truth corresponding to the 1-st task specific output, to thereby generate 1-st obfuscated data corresponding to the original data or the modified data, and
   wherein, while increasing an integer k from 2 to n, the data obfuscation device repeats processes of (i) inputting $(k-1)$-th obfuscated data into a k-th learning network, and allowing the k-th learning network to (i-1) apply a network operation to the $(k-1)$-th obfuscated data using one or more k-th learned parameters of the k-th learning network and thus to (i-2) output k-th characteristic information on the $(k-1)$-th obfuscated data, and (ii) updating the $(k-1)$-th obfuscated data via backpropagation using at least part of (ii-1) one or more $(1\_k)$-th losses calculated by referring to the k-th characteristic information and its corresponding at least one $(1\_k)$-th ground truth and (ii-2) one or more $(2\_k)$-th losses calculated by referring to at least one k-th task specific value and at least one $(2\_k)$-th ground truth wherein the k-th task specific value is generated by using the k-th characteristic information and the $(2\_k)$-th ground truth corresponds to the k-th task specific value, to thereby generate k-th obfuscated data corresponding to the $(k-1)$-th obfuscated data, and wherein, as a result of the repeated processes, n-th obfuscated data which are the obfuscated data corresponding to the original data are generated.

2. The method of claim 1, wherein the data obfuscation device updates the original data or the modified data via backpropagation using at least part of (i) a 1-st average loss which is an average over the $(1\_1)$-st losses to $(1\_n)$-th losses, (ii) a 2-nd average loss which is an average over the $(2\_1)$-st losses to $(2\_n)$-th losses and (iii) a 3-rd average loss which is an average over a 1-st sum loss to an n-th sum loss wherein each of the 1-st sum loss to the n-th sum loss is each piecewise summation of the $(1\_1)$-st losses to the $(1\_n)$-th losses and the $(2\_1)$-st losses to the $(2\_n)$-th losses corresponding to the $(1\_1)$-st losses to the $(1\_n)$-th losses, to thereby generate the obfuscated data.

3. The method of claim 1, wherein, at the step of (b), the data obfuscation device acquires at least one loss gradient for minimizing at least part of the 1-st losses and the 2-nd losses, and backpropagates the loss gradient to the original data or the modified data.

4. The method of claim 1, wherein, at the step of (a), the data obfuscation device generates the modified data corresponding to the original data by performing at least one of a process of adding a random noise created by a random noise generating network to the original data, a process of blurring the original data and, a process of changing a resolution of the original data.

5. A method for concealing original data to protect personal information, a concealed data being recognized as similar or same by a computer but different by a human, comprising steps of:
   (a) a data obfuscation device, on condition that the original data is acquired, modifying the original data, to thereby generate modified data;
   (b) the data obfuscation device, (i) inputting the original data into a learning network, and allowing the learning network to (i-1) apply a network operation to the original data using one or more learned parameters of the learning network and thus to (i-2) output 1-st characteristic information on the original data, the 1-st characteristic information being at least one of features and logits of the original data, and (ii) inputting the modified data into the learning network, and allowing the learning network to (ii-1) apply a network operation to the modified data using the learned parameters and thus to (ii-2) output 2-nd characteristic information on the modified data, the 2-nd characteristic information being at least one of features and logits of the modified data; and
   (c) the data obfuscation device updating the original data or the modified data via backpropagation using one or more data losses created by referring to at least part of (i) one or more 1-st losses calculated by referring to the 1-st characteristic information and the 2-nd characteristic information, and (ii) one or more 2-nd losses calculated by referring to (ii-1) at least one task specific output generated by using the 2-nd characteristic information and (ii-2) at least one ground truth corresponding to the task specific output, to thereby generate obfuscated data corresponding to the original data, wherein (c) includes maintaining the learned parameters during the backpropagation regardless of resultant calculated losses, wherein the learning network includes a 1-st learning network to an n-th learning network respectively having one or more 1-st learned parameters to one or more n-th learned parameters wherein n is an integer greater than 0, wherein, at the step of (b), the data obfuscation device performs processes of (i) inputting the original data into the 1-st learning network, and allowing the 1-st learning network to (i-1) apply a network operation to the original data using one or more 1-st learned parameters of the 1-st learning network and thus to (i-2) output (1_1)-st characteristic information on the original data, and (ii) inputting the modified data into the 1-st learning network, and allowing the 1-st learning network to (ii-1) apply a network operation to the modified data using the 1-st learned parameters and thus to (ii-2) output (2_1)-st characteristic information on the modified data, wherein, at the step of (c), the data obfuscation device updates the modified data via backpropagation using one or more 1-st data losses calculated by referring to at least part of (i) one or more (1_1)-st losses created by referring to the (1_1)-st characteristic information and the (2_1)-st characteristic information, and (ii) one or more (2_1)-st losses created by referring to (ii-1) at least one 1-st task specific output generated by using the (2_1)-st characteristic information and (ii-2) at least one 1-st ground truth corresponding to the 1-st task specific output, to thereby generate 1-st obfuscated data corresponding to the modified data, and wherein, while increasing an integer k from 2 to n, the data obfuscation device repeats processes of (i) inputting the original data into a k-th learning network, and allowing the k-th learning network to (i-1) apply a network operation to the original data using one or more k-th learned parameters of the k-th learning network and thus to (i-2) output (1_k)-th characteristic information on the original data, (ii) inputting (k−1)-th obfuscated data into the k-th learning network, and allowing the k-th learning network to (ii-1) apply a network operation to the (k−1)-th obfuscated data using the k-th learned parameters and thus to (ii-2) output (2_k)-th characteristic information on the (k−1)-th obfuscated data, and (iii) updating the (k−1)-th obfuscated data by backpropagation using one or more k-th data losses created by referring to at least part of (iii-1) one or more (1_k)-th losses calculated by referring to the (1_k)-th characteristic information and the (2_k)-th characteristic information and (iii-2) one Or more (2_k)-th losses calculated by referring to at least one k-th task specific output generated by using the (2_k)-th characteristic information and at least one k-th ground truth corresponding to the k-th task specific output, to generate k-th obfuscated data corresponding to the (k−1)-th obfuscated data, and wherein, as a result of the repeated processes, n-th obfuscated data which are the obfuscated data corresponding to the original data are generated.

6. The method of claim 5, wherein the data obfuscation device updates the original data or the modified data via backpropagation using at least one average data loss which is an average over the 1-st data losses to the n-th data losses, to thereby generate the obfuscated data.

7. The method of claim 6, wherein the data obfuscation device (i) calculates, as the 1-st sub losses, at least one average loss which is an average over the (1_1)-st losses to the (1_n)-th losses, and (ii) calculates the 2-nd sub losses by referring to the specific characteristic information and an average over the (2_1)-st characteristic information to the (2_n)-th characteristic information.

8. The method of claim 5, wherein, at the step of (a), the data obfuscation device generates the modified data corresponding to the original data by performing at least one of a process of adding a random noise created by a random noise generating network to the original data, a process of blurring of the original data, and a process of changing a resolution of the original data.

9. A data obfuscation device for concealing original data to protect personal information, a concealed data being recognized as similar or same as the original data by a computer but different by a human, comprising:

at least one memory that stores instructions; and at least one processor configured to execute the instructions to perform or support another device to perform processes of: (I) on condition that the original data is acquired, inputting the original data or its modified data into a learning network, and allowing the learning network to (i) apply a network operation to the original data or the modified data using one or more learned parameters of the learning network and thus to (ii) output characteristic information on the original data or the modified data, the characteristic information being at least one of features and logits of the original data or modified data, and (II) updating the original data or the modified data via backpropagation using at least part of (i) one or more 1-st losses calculated by referring to the characteristic information and its corresponding at least one 1-st ground truth, and (ii) one or more 2-nd losses calculated by referring to (ii-1) at least one task specific output generated by using the characteristic information and (ii-2) at least one 2-nd ground truth corresponding to the task specific output, to thereby generate obfuscated data corresponding to the original data, wherein (b) includes maintaining the learned parameters during the backpropagation regardless of resultant calculated losses, wherein the learning network includes a 1-st learning network to an n-th learning network respectively having one or more 1-st learned parameters to one or more n-th learned parameters wherein n is an integer greater than 0, wherein, at the process of (I), the processor inputs the original data or the modified data into the 1-st learning network, and allows the 1-st learning network to (i) apply a network operation to the original data or the modified data using the 1-st learned parameters of the 1-st learning network and thus to (ii) output 1-st characteristic information on the original data or the modified data, wherein, at the process of (II), the processor updates the original data or the modified data via backpropagation using at least part of (i) one or more (1_1)-st losses calculated by referring to the 1-st characteristic information and its corresponding at least one (1_1)-st ground truth, and (ii) one or more (2_1)-st losses calculated by referring to (ii-1) at least one 1-st task specific output generated by using the 1-st characteristic information and (ii-2) at least one (2_1)-st ground truth corresponding to the 1-st task specific output, to thereby generate 1-st obfuscated data corresponding to the original data or the modified data, and wherein, while increasing an integer k from 2 to n, the processor repeats processes of (i) inputting (k−1)-th obfuscated data into a k-th learning network, and allowing the k-th learning network to (i-1) apply a network operation to the (k−1)-th obfuscated data using one or more k-th learned parameters of the k-th learning network and thus to (i-2) output k-th characteristic information on the (k−1)-th obfuscated data, and (ii) updating the (k−1)-th obfuscated data via backpropagation using at least part of (ii-1) one or more (1_k)-th losses calculated by referring to the k-th characteristic information and its corresponding at least one (1_k)-th ground truth and (ii-2) one or more (2_k)-th losses calculated by referring to at least one k-th task specific value and at least one (2_k)-th ground truth wherein the k-th task specific value is generated by using the k-th characteristic information and the (2_k)-th ground truth corresponds to the k-th task specific value, to thereby generate k-th obfuscated data corresponding to the (k−1)-th obfuscated data, and wherein, as a result of the repeated processes, n-th obfuscated data which are the obfuscated data corresponding to the original data are generated.

10. The data obfuscation device of claim 9, wherein the processor updates the original data or the modified data via backpropagation using at least part of (i) a 1-st average loss which is an average over the (1_1)-st losses to (1_n)-th losses, (ii) a 2-nd average loss which is an average over the (2_1)-st losses to (2_n)-th losses and (iii) a 3-rd average loss which is an average over a 1-st sum loss to an n-th sum loss wherein each of the 1-st sum loss to the n-th sum loss is each piecewise summation of the (1_1)-st losses to the (1_11)-th losses and the (2_1)-st losses to the (2_n)-th losses corresponding to the (1_1)-st losses to the (1_n)-th losses, to thereby generate the obfuscated data.

11. The data obfuscation device of claim 9, wherein, at the process of (II), the processor acquires at least one loss gradient for minimizing at least part of the 1-st losses and the 2-nd losses, and backpropagates the loss gradient to the original data or the modified data.

12. The data obfuscation device of claim 9, wherein, at the process of (I), the processor generates the modified data corresponding to the original data by performing at least one of a process of adding a random noise created by a random noise generating network to the original data, a process of blurring the original data and, a process of changing a resolution of the original data.

13. A data obfuscation device for concealing original data to protect personal information, a concealed data being recognized as similar or same as the original data by a computer but different by a human, comprising:
   at least one memory that stores instructions; and
   at least one processor configured to execute the instructions to perform or support another device to perform processes of: (I) on condition that the original data is acquired, modifying the original data, to thereby generate modified data, (II) (i) inputting the original data into a learning network, and allowing the learning network to (i-1) apply a network operation to the original data using one or more learned parameters of the learning network and thus to (i-2) output 1-st characteristic information on the original data, the 1-st characteristic information being at least one of features and logits of the original data, and (ii) inputting the modified data into the learning network, and allowing the learning network to (ii-1) apply a network operation to the modified data using the learned parameters and thus to (ii-2) output 2-nd characteristic information on the modified data, the 2-nd characteristic information being at least one of features and logits of the modified data, and (III) updating the original data or the modified data via backpropagation using one or more data losses created by referring to at least part of (i) one or more 1-st losses calculated by referring to the 1-st characteristic information and the 2-nd characteristic information, and (ii) one or more 2-nd losses calculated by referring to (ii-1) at least one task specific output generated by using the 2-nd characteristic information and (ii-2) at least one ground truth corresponding to the task specific output, to thereby generate obfuscated data corresponding to the original data, wherein (III) includes maintaining the learned parameters during the backpropagation regardless of resultant calculated losses, wherein the learning network includes a 1-st learning network to an n-th learning network respectively having one or more 1-st learned parameters to one or more n-th learned parameters wherein n is an integer greater than 0, wherein, at the process of (II), the processor performs processes of (i) inputting the original data into the 1-st learning network, and allowing the 1-st learning network to (i-1) apply a network operation to the original data using one or more 1-st learned parameters of the 1-st learning network and thus to (i-2) output (1_1)-st characteristic information on the original data, and (ii) inputting the modified data into the 1-st learning network, and allowing the 1-st learning network to (ii-1) apply a network operation to the modified data using the 1-st learned parameters and thus to (ii-2) output (2_1)-st characteristic information on the modified data, wherein, at the process of (c), the processor updates the modified data via backpropagation using one or more 1-st data losses calculated by referring to at least part of (i) one or more (1_1)-st losses created by referring to the (1_1)-st characteristic information and the (2_1)-st characteristic information, and (ii) one or more (2_1)-st losses created by referring to (ii-1) at least one 1-st task specific output generated by using the (2_1)-st characteristic information and (ii-2) at least one 1-st ground truth corresponding to the 1-st task specific output, to thereby generate 1-st obfuscated data corresponding to the modified data, and wherein, while increasing an integer k from 2 to n, the processor repeats processes of (i) inputting the original data into a k-th learning network, and allowing the k-th learning network to (i-1) apply a network operation to the original data using one or more k-th learned parameters of the k-th learning network and thus to (i-2) output (1_k)-th characteristic information on the original data, (ii) inputting (k−1)-th obfuscated data into the k-th learning network, and allowing the k-th learning network to (ii-1) apply a network operation to the (k−1)-th obfuscated data using the k-th learned parameters and thus to (ii-2) output (2_k)-th characteristic information on the (k−1)-th obfuscated data, and (iii) updating the (k−1)-th obfuscated data by backpropagation using one or more k-th data losses created by referring to at least part of (iii-1) one or more (1_k)-th losses calculated by referring to the (1_k)-th characteristic information and the (2_k)-th characteristic information and (iii-2) one or more (2_k)-th losses calculated by referring to at least one k-th task specific output generated by using the (2_k)-th characteristic information and at least one k-th ground truth corresponding to the k-th task specific output, to generate k-th obfuscated data corresponding to the (k−1)-th obfuscated data, and wherein, as a result of the repeated processes, n-th obfuscated data which are the obfuscated data corresponding to the original data are generated.

14. The data obfuscation device of claim 13, wherein the processor updates the original data or the modified data via backpropagation using at least one average data loss which is an average over the 1-st data losses to the n-th data losses, to thereby generate the obfuscated data.

15. The data obfuscation device of claim 14, wherein the processor (i) calculates, as the 1-st sub losses, at least one average loss which is an average over the (1_1)-st losses to the (1_n)-th losses, and (ii) calculates the 2-nd sub losses by referring to the specific characteristic information and an average over the (2_1)-st characteristic information to the (2_n)-th characteristic information.

16. The data obfuscation device of claim 13, wherein, at the process of (1), the processor generates the modified data corresponding to the original data by performing at least one of a process of adding a random noise created by a random noise generating network to the original data, a process of blurring of the original data, and a process of changing a resolution of the original data.

* * * * *